US011397560B2

(12) United States Patent
Lewis et al.

(10) Patent No.: US 11,397,560 B2
(45) Date of Patent: Jul. 26, 2022

(54) SYSTEM AND METHOD FOR MANAGING MULTI-CORE ACCESSES TO SHARED PORTS

(71) Applicant: BAE Systems Controls Inc., Endicott, NY (US)

(72) Inventors: Ajen Lewis, Endicott, NY (US); Nicholas M. Didycz, Endicott, NY (US); John Mizerak, Binghamton, NY (US)

(73) Assignee: BAE Systems Controls Inc., Endicott, NY (US)

( * ) Notice: Subject to any disclaimer, the term of this patent is extended or adjusted under 35 U.S.C. 154(b) by 641 days.

(21) Appl. No.: 16/338,781

(22) PCT Filed: Sep. 19, 2018

(86) PCT No.: PCT/US2018/051703
§ 371 (c)(1),
(2) Date: Apr. 2, 2019

(87) PCT Pub. No.: WO2019/060386
PCT Pub. Date: Mar. 28, 2019

(65) Prior Publication Data
US 2021/0326108 A1 Oct. 21, 2021

Related U.S. Application Data

(60) Provisional application No. 62/560,632, filed on Sep. 19, 2017.

(51) Int. Cl.
*G06F 9/52* (2006.01)
*G06F 5/12* (2006.01)
*G06F 9/54* (2006.01)

(52) U.S. Cl.
CPC ............. *G06F 5/12* (2013.01); *G06F 9/526* (2013.01); *G06F 9/544* (2013.01); *G06F 9/546* (2013.01); *G06F 2209/521* (2013.01)

(58) Field of Classification Search
None
See application file for complete search history.

(56) References Cited

U.S. PATENT DOCUMENTS

| 5,459,864 A | 10/1995 | Brent et al. |
| 5,602,536 A | 2/1997 | Henderson et al. |

(Continued)

FOREIGN PATENT DOCUMENTS

| CN | 1269045 C | 8/2006 |
| CN | 101605100 A | 12/2009 |

(Continued)

OTHER PUBLICATIONS

EP Search Report, EP18859932.8, dated Mar. 25, 2021, 8 pages.

(Continued)

*Primary Examiner* — Scott C Sun
(74) *Attorney, Agent, or Firm* — Scott J. Asmus; Sand, Sebolt & Wernow LPA

(57) ABSTRACT

A port is provided that utilized various techniques to manage contention for the same by controlling data that is written to and read from the port in multi-core assembly within a usable computing system. When the port is a sampling port, the assembly may include at least two cores, a plurality of buffers in operative communication with the at least one sampling ports, a non-blocking contention management unit comprising a plurality of pointers that collectively operate to manage contention of shared ports in a multi-core computing system. When the port is queuing port, the assembly may include buffers in communication with the queuing port and the buffers are configured to hold multiple messages in the (Continued)

queuing port. The assembly may manage contention of shared queuing ports in a multi-core computing system.

28 Claims, 10 Drawing Sheets

(56) References Cited

U.S. PATENT DOCUMENTS

| | | | |
|---|---|---|---|
| 5,838,684 | A | 11/1998 | Wicki et al. |
| 6,378,035 | B1 | 4/2002 | Parry et al. |
| 6,408,341 | B1 | 6/2002 | Feeney et al. |
| 6,807,615 | B1 | 10/2004 | Wong et al. |
| 7,426,210 | B1 | 9/2008 | Miles et al. |
| 9,098,462 | B1 | 8/2015 | McNicholl et al. |
| 2002/0184381 | A1 | 12/2002 | Ryan et al. |
| 2004/0015510 | A1 | 1/2004 | Moir et al. |
| 2006/0212662 | A1 | 9/2006 | Ueda |
| 2007/0195761 | A1 | 8/2007 | Tatar et al. |
| 2008/0147996 | A1 | 6/2008 | Jenkins et al. |
| 2009/0307660 | A1* | 12/2009 | Srinivasan ............... G06F 8/314 717/114 |
| 2010/0161951 | A1 | 6/2010 | Chiou et al. |
| 2012/0131139 | A1 | 5/2012 | Siripurapu et al. |
| 2016/0011996 | A1 | 1/2016 | Asaad et al. |
| 2016/0349824 | A1 | 12/2016 | Henry et al. |
| 2016/0357481 | A1 | 12/2016 | Nam et al. |
| 2017/0201367 | A1 | 7/2017 | Van Stensel et al. |

FOREIGN PATENT DOCUMENTS

| | | |
|---|---|---|
| CN | 104679667 A | 6/2015 |
| EP | 0296862 A2 | 12/1988 |
| WO | 2012069831 A1 | 5/2012 |

OTHER PUBLICATIONS

Smith et al., Draft: Have you checked your IPC performance lately?, Unenix, 2012, pp. 2 [online]. Retrieved from the Internet <URL:http://citeseerx.ist.psu.edu/viewdoc/download?doi=10.1.220.9472&rep=rep1&type=pdf>.

International Search Report, Written Opinion of the International Searching Authority, 17 pages, dated Dec. 26, 2018.

* cited by examiner

SYSTEM AND METHOD FOR MANAGING MULTI-CORE ACCESSES TO SHARED PORTS

CROSS REFERENCE TO RELATED APPLICATIONS

This application claims the benefit of U.S. Provisional Application Ser. No. 62/560,632, filed on Sep. 19, 2017; the disclosure of which is incorporated herein by reference.

TECHNICAL FIELD

The present disclosure relates to systems and methods for managing contention to shared ports such that each port can be read from and written to simultaneously, by two or more different cores, without data being lost, duplicated, or corrupted.

BACKGROUND

A data structure is a data organization, management and storage format that enables efficient access and modification. More precisely, a data structure is a collection of data values, the relationships among them, and the functions or operations that can be applied to the data. A sampling port is a type of data structure defined by ARINC 653 for communication between partitions. Further the sampling port may include a standardized set of data structures for exchanging parametric data. These may help to reduce unnecessary variability in parameter formats, thus reducing the need for custom input/output (I/O) processing. The sampling ports may further enable portability of applications and improve efficiency of the core software. In accordance with one aspect, an exemplary sampling port may provide that each of its entries has a fixed size, and that only the last message written to the port can be read from it.

A computer core or central processing unit (CPU) refers to the electronic circuitry within a computer that carries out the instructions of a computer program by performing the basic arithmetic, logical, control and I/O operations specified by the instructions. A multi-core processor is a single computing component with two or more independent processing units called cores, which read and execute program instructions. The instructions are ordinary CPU instructions (such as add, move data, and branch) but the single processor can run multiple instructions on separate cores at the same time, increasing overall speed for programs amenable to parallel computing.

SUMMARY

In a multi-core system, inter-core contention exists when one core attempts to read a sampling port while another core is writing to the same port. If this contention is not properly managed, then the reading core may read a corrupt entry, in which the message that was previously written to the sampling port has been partially overwritten with the writing core's new message. A proper non-blocking contention management scheme for sampling ports ensures that the reading core will always read the most recent fully-written entry in the port. Thus, issues continue to exist with sampling ports when there is inter-core contention for reading and writing to the same port. The present disclosure addresses these and other issues by providing at least one technique to safely manage port contention in multi-core systems without sacrificing timing performance, making it especially suitable for real-time systems. More particularly, in one exemplary solution, the present disclosure provides contention management nature or implementation of the non-blocking contention management. In a typical data-sharing scenario, either the writing process is forced to wait until a read is complete, or a read is forced to wait until a write is complete. The present disclosure manages contention without the need to wait for access. This allows for more determinism with respect to timing and, in some processing environments, more efficient use of processor time.

In accordance with one aspect, an exemplary embodiment of the present disclosure may provide a scheme or framework that manages contention over sampling ports by organizing sampling ports as buffer. In one example the buffer is a triple buffer and is a circular array of three blocks of memory (buffers), each of which can hold a single message in the sampling port. This arrangement allows data to be simultaneously written to and read from a port, without data corruption, by ensuring that the buffer being read is not the same buffer as the buffer being written to.

In accordance with another aspect, an exemplary embodiment of the present disclosure may provide a system or method for managing contention of shared ports in a multi-core system, comprising: a plurality of sampling ports, wherein at least one core in the multi-core system read and/or writes to the sampling ports; a plurality of buffers configured to be coupled to the sampling ports, wherein a number of buffers coupled to each sampling port is at least one more than a number of cores of the multi-core system, and the buffers are configured to hold a single message in the sampling port; and a non-blocking contention management unit comprising a plurality of pointers, wherein the pointers manage the buffers. This exemplary embodiment may further provide wherein there are two cores and the buffer is a triple buffer. This exemplary embodiment may further provide wherein the sampling port is a type of data structure defined by ARINC 653 for communications. This exemplary embodiment may further provide a plurality of pointers to manage the buffers. This exemplary embodiment may further provide wherein the pointers comprise a head pointer, a tail pointer and a busy pointer. This exemplary embodiment may further provide a freshness reporting operation.

In accordance with another aspect, an exemplary embodiment of the present disclosure may provide a system or method for managing contention of shared ports in a multi-core system, comprising: a plurality of queuing ports, wherein at least one core in the multi-core system read and/or writes to the queuing ports; at least one circular first-in-first-out (FIFO) buffer configured to hold multiple messages, wherein an entry in the FIFO buffers comprises a message and a header; and a non-blocking contention management unit comprising a plurality of pointers and counters, wherein the pointers and counters manage the FIFO buffers. This exemplary embodiment may further provide wherein the queuing port is a type of data structure defined by ARINC 653 for communications. This exemplary embodiment may further provide wherein the pointers comprise a head pointer, and a tail pointer, and the counters comprise a push counter and a pop counter.

In accordance with yet another aspect, an exemplary embodiment of the present disclosure may provide an assembly comprising: at least one sampling port; at least two cores, wherein a first core reads the sampling port and a second core writes to the sampling port; a plurality of buffers in operative communication with the at least one sampling ports, wherein a number of buffers is at least one more than a number of cores, and the buffers are configured to hold a single message in the sampling port; a non-blocking contention management unit comprising a plurality of pointers, wherein the pointers manage the buffers; and wherein the assembly is adapted to manage contention of shared ports in a multi-core computing system. This exemplary embodiment may further provide wherein the first core is exclusively a reading core; and wherein the second core is exclusively a writing core. This exemplary embodiment may further provide a first buffer, a second buffer, and a third buffer; wherein the first core reads data from the first buffer simultaneous to the second core writing data to the second buffer. This exemplary embodiment may further provide a head pointer indicating which buffer data was most recently written; a tail pointer indicating to which buffer data will next be written; and a busy pointer indicating that a buffer is being read. This exemplary embodiment may further provide wherein there is one busy pointer per core. This exemplary embodiment may further provide write instructions that, when executed by a processor, only update the head pointer and the tail pointer; read instructions that, when executed by a processor, only update the busy pointer associated with the first core; wherein the write instructions and the read instructions are adapted to reduce the likelihood or preclude (i.e., completely eliminates) contention over the pointers. This exemplary embodiment may further provide wherein the pointers may be read by the first core and the second core but are only modified by the second core. This exemplary embodiment may further provide access logic that accesses the pointers atomically to reduce the likelihood of pointer contention or corruption caused by simultaneous read and write operations. This exemplary embodiment may further provide instructions that, when executed by a processor, move the tail pointer to a subsequent buffer and if the tail pointer equals the busy pointer, then advance the tail pointer to an additional buffer; and instructions that, when executed by a processor, write data to the buffer indicated by the tail pointer; instructions that, when executed by a processor, set the head pointer to equal the tail pointer when the data is written as indicated by the tail pointer. This exemplary embodiment may further provide instructions that, when executed by a processor, report freshness of the data in the buffer through one of (i) a freshness flag and (ii) a unique message ID. This exemplary embodiment may further provide instructions that, when executed by a processor, report freshness of the data with the freshness flag to maintain a flag that indicates whether the port contains fresh or stale data; instructions that, when executed by a processor, sets the freshness flag to fresh when data is written and sets the freshness flag to stale when data is read; wherein if a read operation and write operation occur at the same time, then a sequence is determined by access to the head pointer. This exemplary embodiment may further provide instructions that, when executed by a processor, update the freshness flag before the first core can read the head pointer and update the freshness flag (i.e., update the freshness flag and the head pointer atomically, so that the updates appear to occur simultaneously from the other core's perspective). This exemplary embodiment may further provide instructions that, when executed by a processor, update the freshness flag at the same time that the head pointer is accessed (i.e., update the freshness flag and read the head pointer atomically, so that the update and the read appear to occur simultaneously from the other core's perspective). This exemplary embodiment may further provide instructions that, when executed by a processor, assign a unique ID to each message written to the sampling port; instructions that, when executed by a processor, compare the unique ID of each message to a unique ID of the previous message read from the sampling port; wherein if the IDs are equal, then the port is stale and if the IDs are unequal, then the port is fresh.

In yet another aspect, an exemplary embodiment of the present disclosure may provide a method comprising: reading from, with a first core, at least one buffer from a sampling port; writing to, with a second core, at least one buffer from the sampling port; managing contention to buffers in the sampling port with a plurality of pointers to manage contention of shared ports in a multi-core computing system. This exemplary embodiment or another exemplary embodiment may further provide reading data, with the first core, from a first buffer simultaneous to the second core writing data to a second buffer. This exemplary embodiment or another exemplary embodiment may further provide indicating, with a head pointer, which buffer data was most recently written; indicating, with a tail pointer, which buffer data will be next be written; and indicating, with a busy pointer, that a buffer is being read. This exemplary embodiment or another exemplary embodiment may further provide accessing the pointers atomically to reduce the likelihood of pointer corruption or contention caused by simultaneous read and write operations. This exemplary embodiment or another exemplary embodiment may further provide moving the tail pointer to a subsequent buffer and if the tail pointer equals the busy pointer, then advancing the tail pointer to an additional buffer; writing data to the indicated buffer by the tail pointer; setting the head pointer to equal the tail pointer when the data is written as indicated by the tail pointer. This exemplary embodiment or another exemplary embodiment may further provide reporting freshness of the data with the freshness flag to maintain a flag that indicates whether the port contains fresh or stale data; setting the freshness flag to fresh when data is written and set the freshness flag to stale when data is read; wherein if a read operation and write operation occur at the same time, then a sequence is determined by access to the head pointer. This exemplary embodiment or another exemplary embodiment may further provide updating the freshness flag before the first core can read the head pointer and update the freshness flag. Alternatively, update the freshness flag and the head pointer atomically, so that the updates appear to occur simultaneously from the other core's perspective. This exemplary embodiment or another exemplary embodiment may further provide updating the freshness flag at the same time that the head pointer is accessed. Alternatively, update the freshness flag and read the head pointer atomically, so that the update and the read appear to occur simultaneously from the other core's perspective. This exemplary embodiment or another exemplary embodiment may further provide assigning a unique ID to each message written to the sampling port; comparing the unique ID of each message to a unique ID of the previous message read from the sampling port; and wherein if the IDs are equal, then the port is stale and if the IDs are unequal, then the port is fresh.

In yet another aspect, an exemplary embodiment of the present disclosure may provide an assembly comprising: at least one queuing port; at least two cores, wherein a first core reads the sampling port and a second core writes to the sampling port; a plurality of buffers in operative communication with the at least one queuing port, wherein the number of buffers is at least one more than the number of cores, and the buffers are configured to hold multiple messages in the queuing port; a non-blocking contention management unit comprising a plurality of pointers, wherein the pointers manage the buffers; and wherein the assembly is adapted to manage contention of shared queuing ports in a multi-core computing system. This exemplary embodiment or another exemplary embodiment may further provide a plurality of queuing ports, wherein at least one core in the multi-core system reads or writes to the queuing ports; a plurality of circular FIFO buffers configured to be coupled to the queuing ports, wherein an entry in the FIFO buffers comprises a message and a header; and a non-blocking contention management unit comprising a plurality of pointers and counters, wherein the pointers and counters manage the FIFO buffers. This exemplary embodiment or another exemplary embodiment may further provide a plurality of pointers including a head pointer and a tail pointer; a push counter that counts a number of push or write operations; and a pop counter that counts a number of read or pop operations. This exemplary embodiment or another exemplary embodiment may further provide instructions that, when executed by a processor, use the head pointer and the tail pointer to access messages in the circular FIFO buffer to determine how much space remains in the circular FIFO buffer; and instructions that, when executed by a processor, determine whether the circular FIFO buffer is full or empty.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
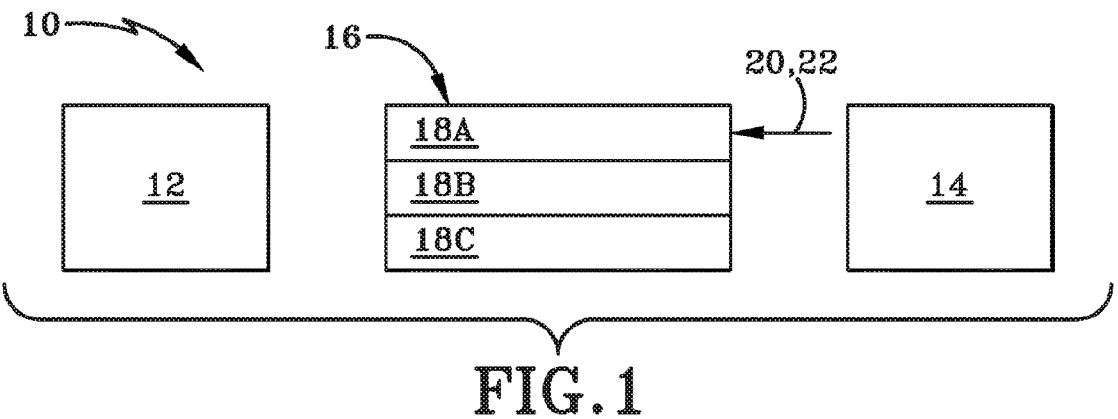
FIG. 1 depicts an initial state of a sampling port, with its associated pointers.

Before discussing exemplary aspects of the present disclosure, the present disclosure provides a brief discussion and introduction to the computing environment in which the core(s) and sampling port (introduced and discussed below) operate.

Generally, aspects of the cores and sampling port exist within an exemplary computer performing computing functions and may include a processor, a memory, and input/output ports operably connected by a bus. In one non-limiting example, the computer includes read and write logic configured to, by one of the cores, write data to or read data from one of multiple buffers in the sampling port. In different examples, the logic may be implemented in hardware, software, firmware, and/or combinations thereof. Thus, the logic may provide framework (e.g., hardware, software, and firmware) for writing or reading data from a buffer in a sampling port. While some aspects of the logic may be a hardware component attached to the bus, it is to be appreciated that in one an alternative example, the logic could be implemented in the processor.

Generally describing an example configuration of the computer, the processor may be a variety of various processors including dual microprocessor and other multi-processor architectures. A memory may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk may be operably connected to the computer via, for example, an input/output interface (e.g., card, device) and an input/output port. The disk may be, for example, a magnetic disk drive, a solid state disk drive, a floppy disk drive, a tape drive, a Zip drive, a flash memory card, and/or a memory stick. Furthermore, the disk may be a CD-ROM, a CD recordable drive (CD-R drive), a CD rewriteable drive (CD-RW drive), and/or a digital video ROM drive (DVD ROM). The memory can store a process and/or a data, for example. The disk and/or the memory can store an operating system that controls and allocates resources of the computer.

The bus may be a single internal bus interconnect architecture and/or other bus or mesh architectures. While a single bus is envisioned in one embodiment, it is to be appreciated that the computer may communicate with various devices, logics, and peripherals using other busses (e.g., PCIE, SATA, InfiniBand, 1394, USB, Ethernet). The bus can be types including, for example, a memory bus, a memory controller, a peripheral bus, an external bus, a crossbar switch, and/or a local bus.

The computer may interact with input/output devices via the input/output interfaces and the input/output ports. Input/output devices may be, for example, a keyboard, a microphone, a pointing and selection device, cameras, unmanned aerial Vehicles (i.e., drones), video cards, displays, the disk, the network devices, and so on. The input/output ports may include, for example, serial ports, parallel ports, and USB ports.

The computer can operate in a network environment and thus may be connected to the network devices via the input/output interfaces, and/or the input/output ports. Through the network devices, the computer may interact with a network. Through the network, the computer may be logically connected to remote computers (i.e., the receiving party computer). Networks with which the computer may interact include, but are not limited to, a local area network (LAN), a wide area network (WAN), and other networks. The networks may be wired and/or wireless networks.

FIG. 1-FIG. 15 depict a hardware assembly of a computer generally at 10. The hardware assembly 10 cooperates with software, logic, or other computer architecture or framework so as to form a usable computing system. The hardware assembly 10 may include a first core 12, a second core 14, and a sampling port 16. Sampling port 16 is a mechanism that allows a partition to access a channel of communication configured to operate in sampling mode. This means that when new data is received and stored in this port, it replaces the ports previous data. It does not append additional data as a queue or queuing port would. The sampling port 16 may be coupled, directly or indirectly, with a plurality of buffers 18. Alternatively, the sampling port 16 may include the plurality of buffers 18. In each instance, the number of buffers 18 equals the number of cores plus one. Thus, FIGS. 1-15 depict a sampling port 16 with a first buffer 18A, a second buffer 18B, and a third buffer 18C. The hardware assembly 10 of the present disclosure may be expanded with additional cores. As such, the sampling port 16 will expand the number of buffers 18 therein to accommodate the number of cores 14 plus one. For example, if the hardware assembly 10 included three cores 14, then the sampling port 16 would have four buffers 18. If the hardware assembly 10 had four cores 14, then the sampling port 16 would have five buffers 18 and so on.

The hardware assembly 10 further includes pointers to manage the buffers 18 in the sampling port 16. In one particular embodiment, there are three types of pointers, namely, a head pointer 20, a tail pointer 22, and a busy pointer 24. The pointers 20, 22, 24 may be part of a non-blocking contention management unit that enables the pointers to manage the buffers 18. The non-blocking contention management unit refers a device or logic, that in a typical data-sharing scenario, either the writing process is forced to wait until a read is complete, or a read is forced to wait until a write is complete. One exemplary method manages contention without the need to wait for access. This allows for more determinism with respect to timing and, in some processing environments, more efficient use of processor time.

In one particular embodiment, the sampling port 16 defines a shared memory in which the first buffer 18A, the second buffer 18B, and the third buffer 18C cooperate to receive and enable the reading of data in the buffers 18 by the first core 12 and the second core 14. While the figures depict that the first buffer 18A is positioned vertically above the second buffer 18B, which is positioned above the third buffer 18C, the arrangements depicted schematically in the figures are for illustrative purposes and the physical construction of the buffers 18 may be accomplished in any manner.

Prior to describing the operation of hardware assembly 10 in a usable computing system, reference will be made to the figures and the structure depicted therein.

FIG. 1 depicts that the first core 12 is a consumption core that reads data from the sampling port 16 for use in application software in the usable computing system. The second core 14 is a production core that is receiving data from an external communication source so that it can be written to the sampling port 16. The head pointer 20 and the tail pointer 22 are both pointed or directed at the first buffer 18A in the sampling port 16. The busy pointer 24 is equal to null and is therefore not shown in FIG. 1. Thus, FIG. 1 generally depicts the initial state of the sampling port 16 and the first core 12 is the reading core that consumes data and the second core 14 is the writing core that produces data.

Figure 2:
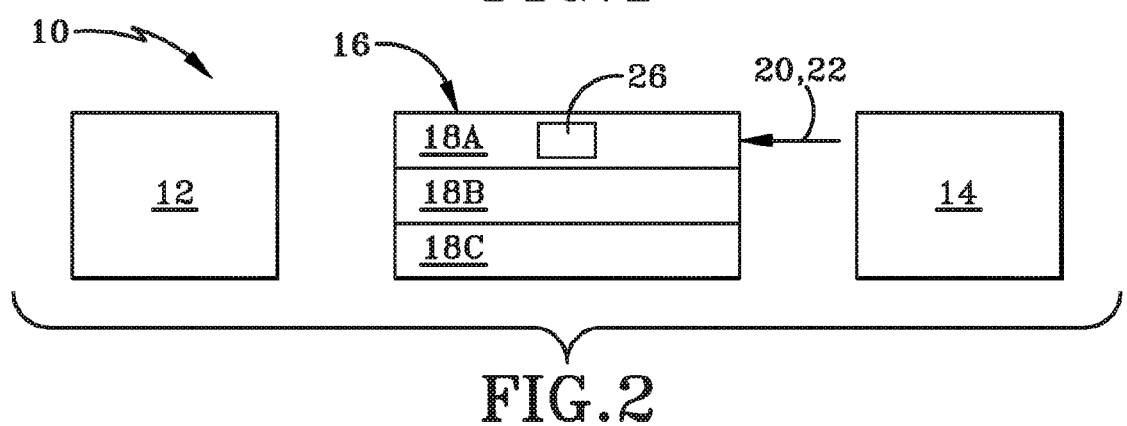
FIG. 2 depicts the sampling port during a write operation.

FIG. 2 depicts the hardware assembly 10, and more particularly the sampling port 16, during a write operation. During the write operation of FIG. 2, the head and tail pointers 20, 22 are directed and point at the first buffer 18A. Box 26 represents the writing of new data in the first buffer 18A by the second core 14. The busy pointer 24 is not shown because it is still equal to null.

Figure 3:
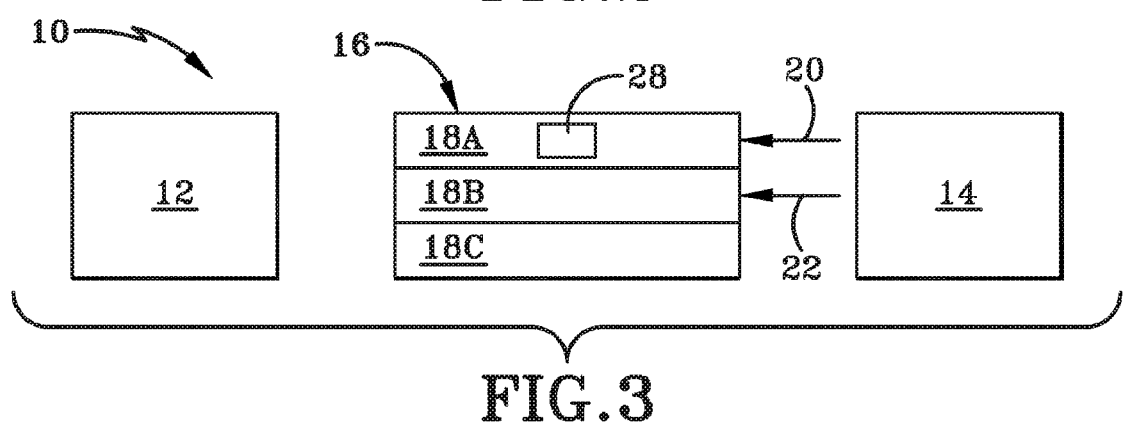
FIG. 3 depicts the sampling port after the write operation.
Figure 4:
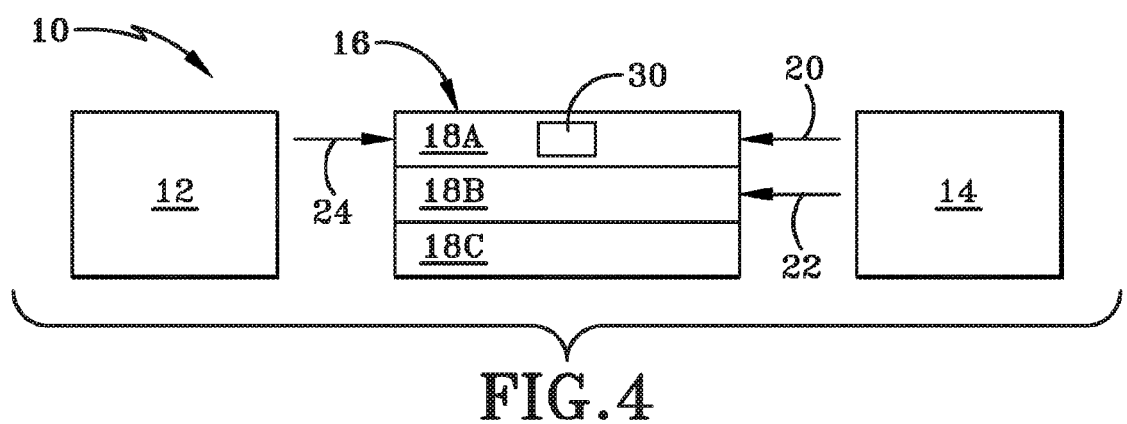
FIG. 4 depicts the sampling port during a read operation.

FIG. 3 depicts the hardware assembly 10, namely, the sampling port 16 after the write operation depicted in FIG. 2. Box 28 in the first buffer 18 represents fresh data that is stored in the first buffer 18A after the write operation of FIG. 2. After the write operation, the head pointer 20 is pointed or directed at the first buffer 18A. The tail pointer 22 is directed or pointed at the second buffer 18B. The busy pointer 24 is not shown because it is still equal to null, FIG. 4 depicts the hardware assembly 10, namely, the sampling port 16 during a read operation of the fresh data, represented by box 28, of FIG. 3. The read operation is accomplished by the first port 12 reading data from the first buffer 18A. During the read operation, the busy pointer 24 is directed towards the first buffer 18A. The head pointer 20 is directed or pointed at the first buffer 18A and the tail buffer 22 is directed or pointed at the second buffer 18B. Box 30 represents that the data in the first buffer 18A is marked stale or read by the first core 12.

Figure 5:
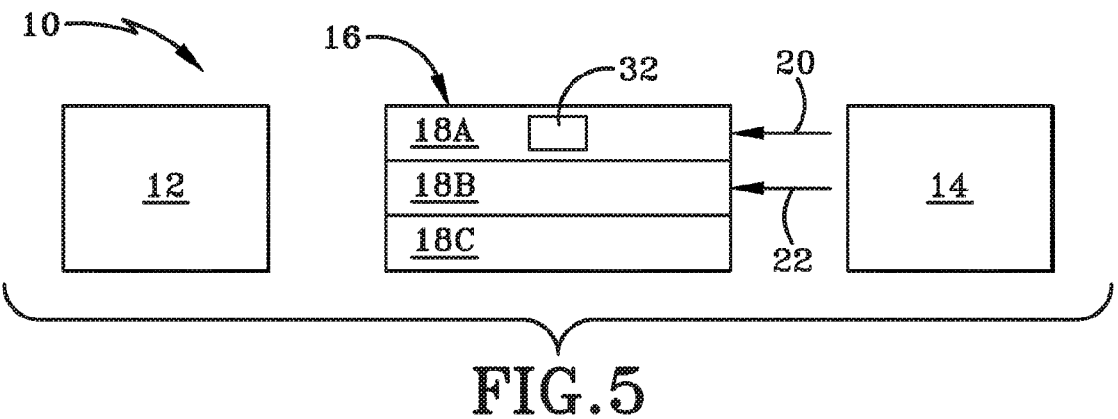
FIG. 5 depicts the sampling port after the read operation.

FIG. 5 depicts the hardware assembly 10, namely, the sampling port 16 after the read operation of FIG. 4. Box 32 in the first buffer 18A represents that the data is stale after the read operation performed by the first core 12. Since the read operation is complete, the busy pointer 24 of the first core 12 is equal to null and therefore not shown in FIG. 5. The head pointer is pointed or directed at the first buffer 18A and the tail pointer 22 is directed or pointed at the second buffer 18B.

Figure 6:
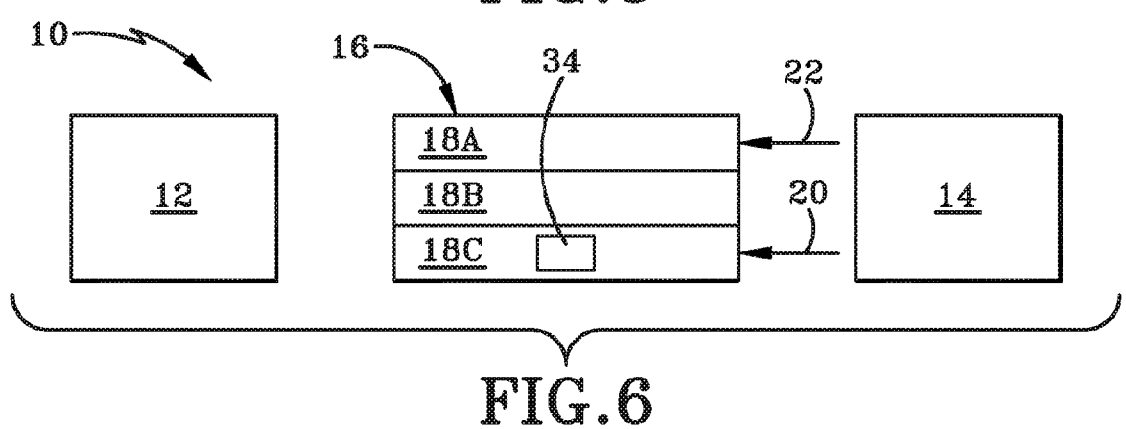
FIG. 6 depicts the sampling port with new or fresh data.

FIG. 6 depicts the hardware assembly 10, namely, the sampling port 16 with fresh data and all previous data from FIG. 5 having been deleted. Box 34 represents fresh data in the third buffer 18C. The head pointer 20 is pointed or directed at the third buffer 18C and the tail pointer 22 is pointed or directed at the first buffer 18A.

Figure 7:
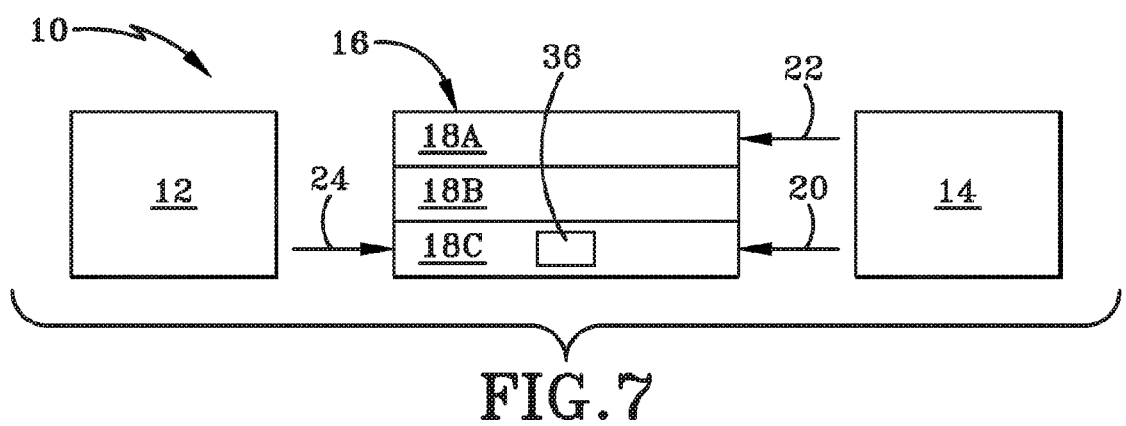
FIG. 7 depicts the sampling portion with a slow read operation in progress.

FIG. 7 depicts the hardware assembly 10, namely, the sampling port 16 with a slow-read operation in progress. When the slow-read operation is in progress, the head pointer 20 is pointed at the third buffer 18C and the tail pointer 22 is pointed at the first buffer 18A. The busy pointer 24 is pointed at the third buffer 18C indicating that the first core 12 is reading or otherwise consuming the data. Box 36 in the third buffer 18C represents that the data that was previously fresh in FIG. 6 has been marked stale or read. Note that if the first core 12 continues reading during multiple second core 14 updates, the second core 14 will continually update and the remaining two buffers (first buffer 18A and second buffer 18B) are not being read by the first core 12.

Figure 8:
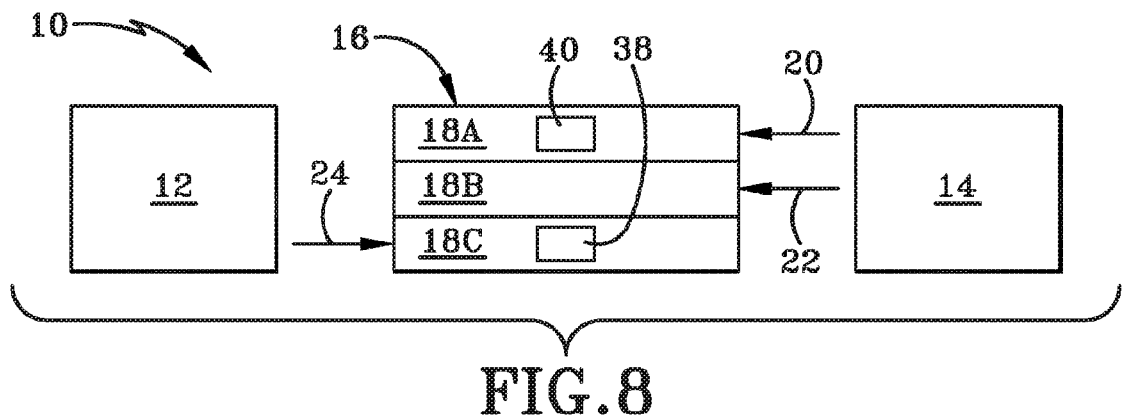
FIG. 8 depicts the sampling port with a first write operation occurring during a slow read operation.

FIG. 8 depicts the hardware assembly 10, namely, the sampling port 16 with the first write operation occurring during a slow-read operation introduced in FIG. 7. In the first write operation, the head pointer 20 is directed or pointed at the first buffer 18A and the tail pointer 22 is directed or pointed at the second buffer 18B. The busy pointer 24 is pointed at the third buffer 18C. The busy pointer 24 directed at the third buffer 18C is indicative of the first core 12 reading the data that is still being read by the first core 12, as indicated by Box 38. Simultaneous to the data of box 38 still being read in the third buffer 18O, fresh data is produced and written by the second core 14 as indicated by Box 40. If the first core 12 continues reading the data, as represented by Box 38, in the third buffer 18O during multiple second core 14 updates, then the second core 14 will continually update the two remaining buffers that are not being read by the first core 12.

Figure 9:
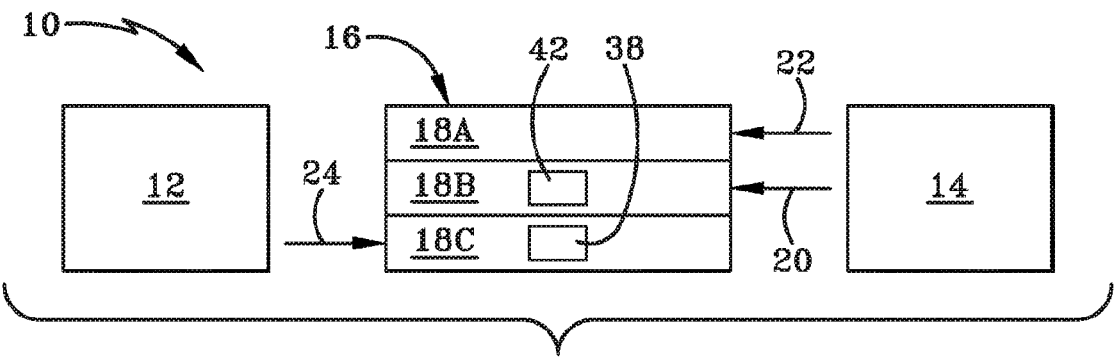
FIG. 9 depicts the sampling port with a second write operation occurring during a slow read operation.

FIG. 9 depicts the hardware assembly 10, namely, the sampling port 16 with a second write operation occurring during the slow-read operation introduced in FIG. 7 (subsequent to the first write operation of FIG. 8). In the second write operation, the busy pointer 24 is still pointed at the third buffer 18C and Box 38 continues to present data that is still being read by the first core 12. The head pointer 20 is directed at the second buffer 18B and the tail pointer 22 is directed at the first buffer 18A. Box 42 represents fresh data that is written into the second buffer 18B by the second core 14. If the first core 12 continues reading during multiple second core 14 updates, then the second core 14 will continually update the remaining two buffers that are not being read by the first core 12.

Figure 10:
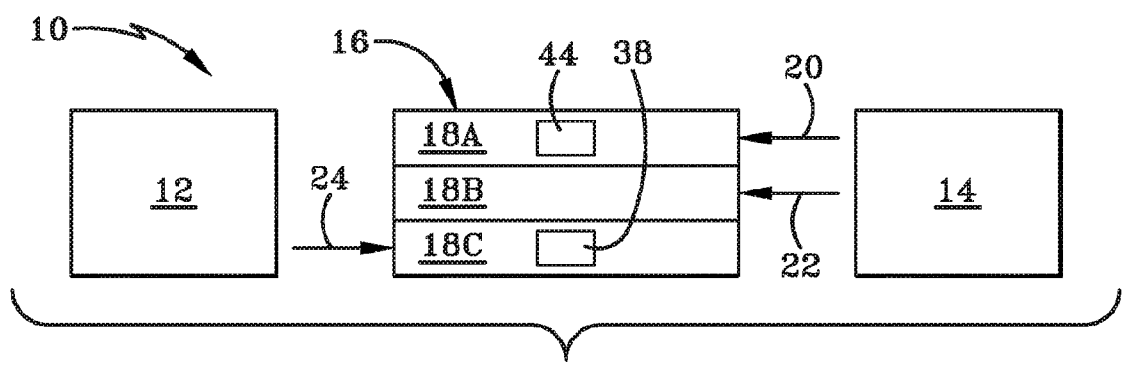
FIG. 10 depicts the sampling port with a third write operation occurring during a slow read operation and identifying the ability of a triple buffer to maintain fresh data coherently.

FIG. 10 depicts the hardware assembly 10, namely, the sampling port 16 with a third write operation occurring during the slow-read operation subsequent to the second operation of FIG. 9. During the third write operation of FIG. 10, the head pointer 20 is directed or pointed to the first buffer 18A and the tail pointer 22 is directed at the second buffer 18B. The busy pointer 24 is still directed at the third buffer 18C which indicates that the first core 12 is continuing to read the data that is still being read as indicated by Box 38. The second core 14 writes fresh data, as indicated by Box 44, into the first buffer 18A. If the first core 12 continues reading during multiple second core 14 updates, then the second core 14 will continually update the remaining two buffers that are not being read by the first core 12.

Figure 11:
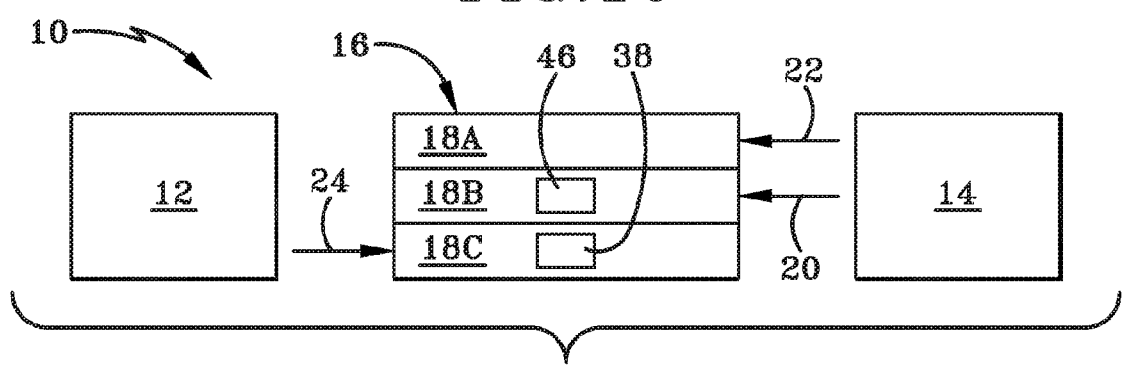
FIG. 11 depicts the sampling port with a fourth write operation occurring during a slow read operation and identifying the ability of the triple buffer to maintain fresh data coherently.

FIG. 11 depicts the hardware assembly 10, namely, the sampling port 16 with a fourth write operation occurring during the slow-read operation subsequent to the third write operation indicated by FIG. 10. Subsequent to the third write operation of FIG. 10, the fourth write operation indicates that the head pointer 20 is directed at the second buffer 18B. The tail pointer 22 is directed at the first buffer 18A. Since the slow-read operation is still occurring, the data that is still being read in the third buffer 18C is indicated by Box 38 and the tail pointer 24 is directed at the same such that the first core 12 is reading the data in the third buffer 18C. Fresh data is written by the second core 14 into the second buffer 18B as indicated by Box 46. If the first core 12 continues reading during the multiple second core 14 updates, then the second core 14 will continually update the remaining buffers that are not being read by the first core 12.

Figure 12:
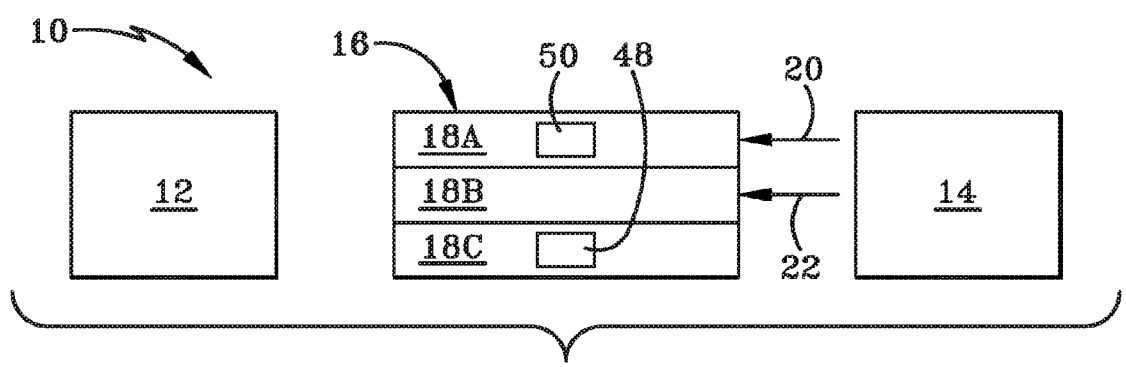
FIG. 12 depicts the sampling port after four write operations during a slow read operation.

FIG. 12 depicts the hardware assembly 10, namely, the sampling port 16 after the four write operations of FIG. 8, FIG. 9, FIG. 10, and FIG. 11 that occurred during a slow-read operation. The data formerly represented by Box 38 in FIG. 8-FIG. 11 is now considered stale and represented by Box 48 in the third buffer 18C. The busy pointer is null (and therefore not shown) because no read operation is being performed. The head pointer 20 is directed or pointed at the first buffer 18A and the tail pointer 22 is directed or pointed at the second buffer 18B. Fresh data being written to the first buffer 18A is represented by Box 50.

Figure 13:
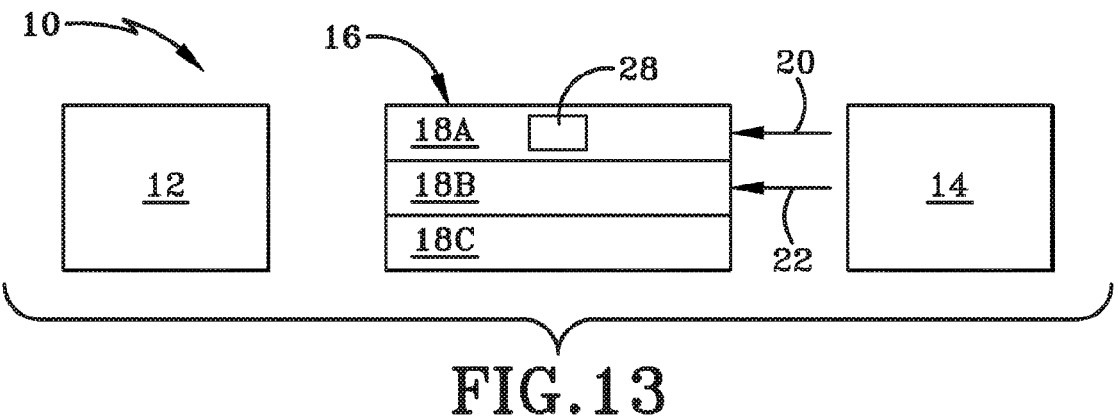
FIG. 13 depicts the sampling port with new or fresh data.

FIG. 13 is similar to FIG. 3 in that it represents a sampling port 16 with fresh data being written into the first buffer 18A. Similar to FIG. 3, FIG. 13 identifies the fresh data with Box 28.

Figure 14:
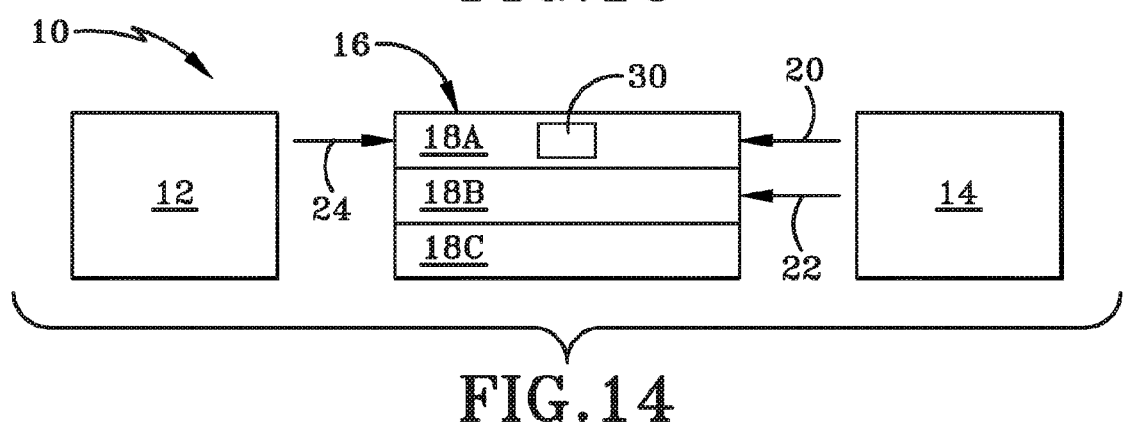
FIG. 14 depicts the sampling port with the fresh data being read.

FIG. 14 represents the sampling port 16 with the fresh data being read, similar to what was shown in FIG. 4. Accordingly, in FIG. 14, Box 30 represents the data from Box 13 being marked stale as it is read as indicated by the busy pointer 24 from the first core 12.

Figure 15:
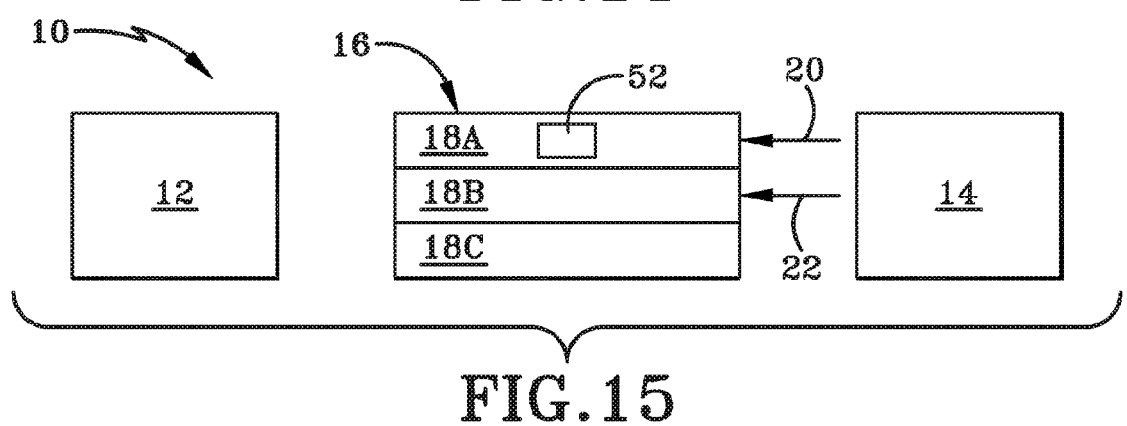
FIG. 15 depicts the sampling port with old or stale data.

FIG. 15 represents the sampling port 16 with stale data subsequent to the read operation indicated in FIG. 14. The stale data is represented by Box 52. The head, pointer 20 is directed at the first buffer 18A and the tail pointer 22 is directed at the second buffer 18B. The busy pointer 24 is equal to null and is therefore not shown in FIG. 15.

Figure 16:
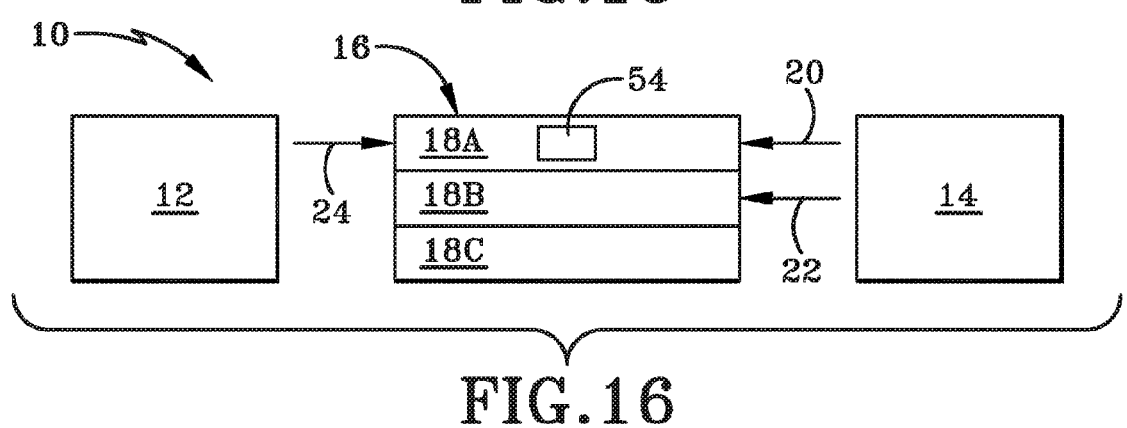
FIG. 16 depicts the sampling port with the stale data being read.

FIG. 16 depicts the hardware assembly 10, namely, the sampling port 16 subsequent to the stale data being read from FIG. 15. When the stale data 52 from FIG. 15 is being read, the busy pointer 24 from the first core 12 is pointed at the first buffer 18A. During the stale data reading, the first buffer 18A has its data marked as stale or read, as indicated by Box 54. The head pointer 20 is directed at the first buffer 18A and the tail pointer 22 is directed at the second buffer 18B. Stated otherwise, FIG. 16 indicates that the first core 12 is able to read the stale data, previously depicted in FIG. 15.

FIG. 17-FIG. 22 depict an alternative embodiment in accordance with one aspect of the present disclosure. FIGS. 17-22 depict a hardware assembly of a computing device generally at 110. The hardware device 110 of the second embodiment may include a first core 112, a second core 114, and a queuing port 116. In the hardware assembly 110, the first core 112 is the writing core and the second core 114 is the reading core. The queuing port 116 may include a control structure 118 and a data buffer 120. The control structure 118 includes a head pointer 122, a tail pointer 124, a pop counter 126, and a push counter 128. The data buffer 120 is configured to receive message therein as will be described in greater detail below.

Figure 17:
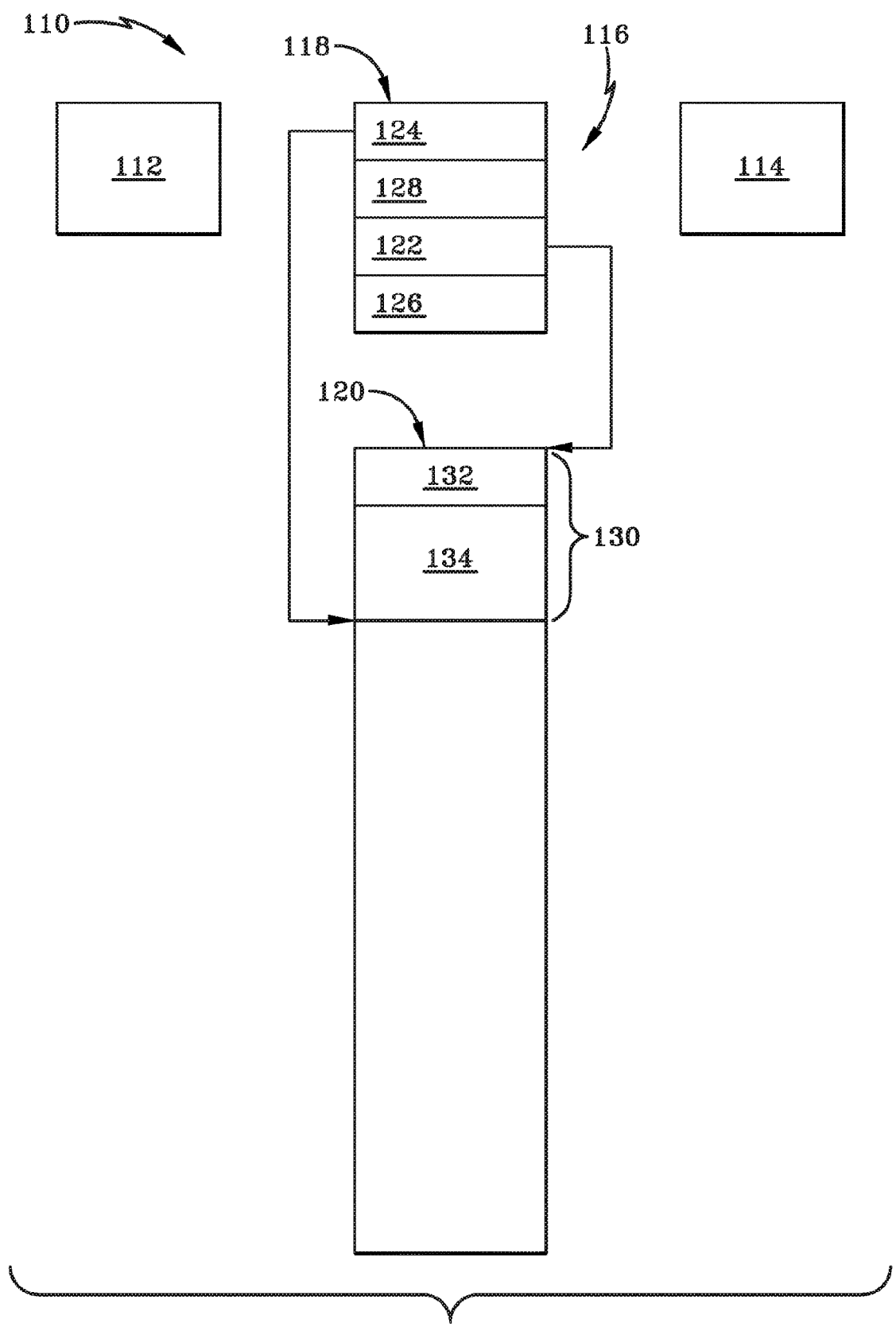
FIG. 17 depicts a queueing port having a single message, and a first core as the writing core and a second core as the reading core, and a shared memory.

FIG. 17 depicts that the queuing port 116 includes a single message 130 composed of the first message size 132 and the first message data 134. The head pointer 122 is pointed at the beginning of the first message 130 and the tail pointer 124 is directed to the end of the first message 130. The first core 112 enables a sender to keep track of the messages sent by incrementing the tail pointer 124 to a position which points to where the next message will be written. The second core 114 enables a receiver to keep track of messages received by incrementing the head pointer 122 to point to where the next message will be read. Thus, in this scenario, since the second core 114 is the reading core, FIG. 17 indicates that the first message 130 will be read as indicated by the head pointer 122 pointing to where the next message (I.e., the first message 130) will be read.

Figure 18:
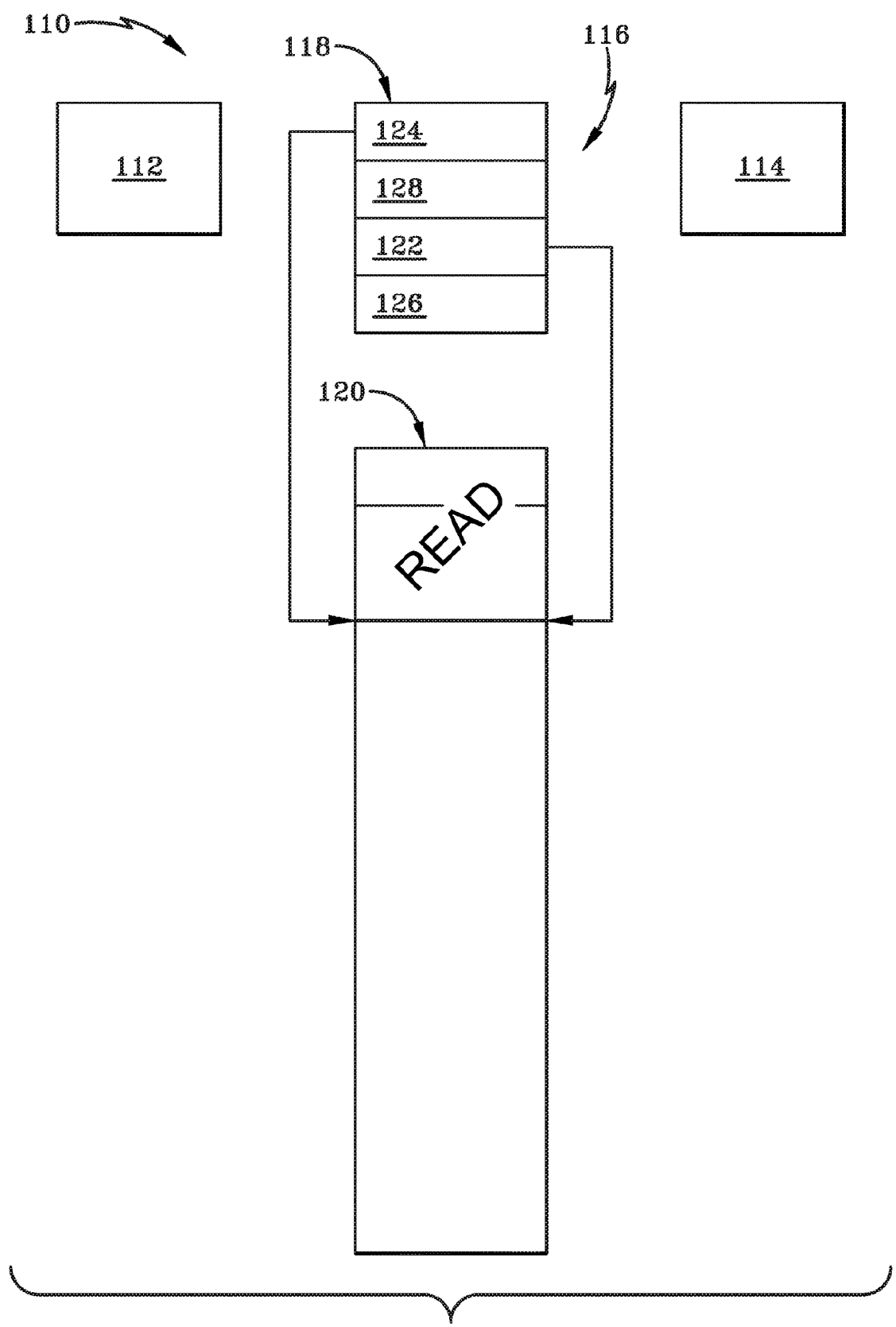
FIG. 18 depicts the queuing port becoming empty after a pop operation.

FIG. 18 depicts the queuing port 116 becoming empty after a pop operation. The second core 114 reads the first message 130 (FIG. 17) and advances the head pointer 122 by the message size, wherein "READ" in FIG. 18 represents the first message being read. The data buffer 120 of the queuing port 116 is now empty. The head pointer 122 and the tail pointer 124 will be equal when the data buffer 120 of the queuing port 116 is full or empty. FIG. 18 further depicts that the data buffer 120 of the queuing port 116 is empty. The pop counter 126 and the push counter 128 will be equal when the data buffer 120 of the queuing port 116 is not full. In one particular embodiment, if the head pointer 122 equals the tail pointer 124 and the push counter 128 equals the pop counter 126, then the data buffer 120 of the queuing port 116 is empty.

Figure 19:
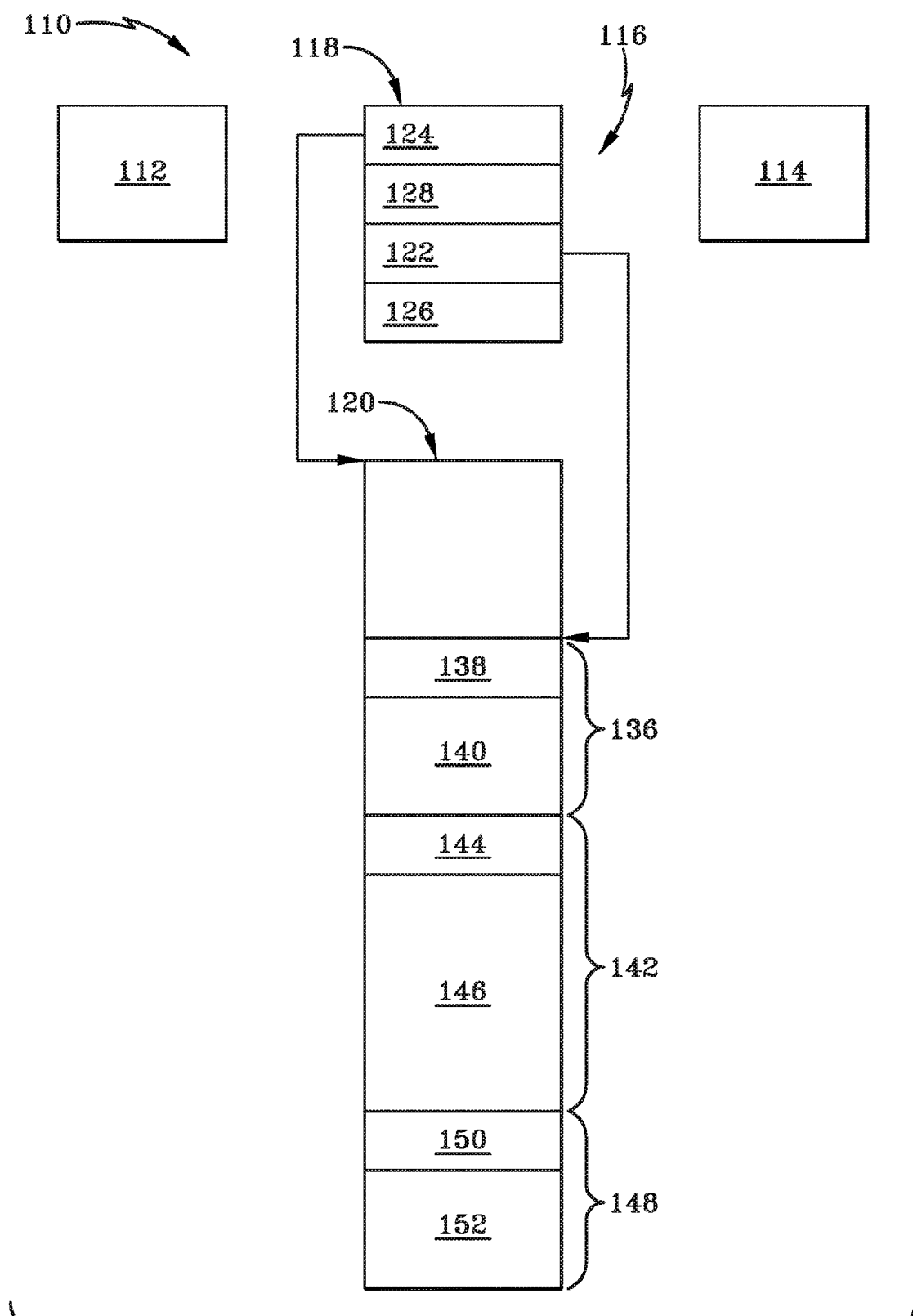
FIG. 19 depicts the queuing port with a tail pointer wrapping around.

FIG. 19 depicts the queuing port 116 with its tail pointer wrapping around. Namely, the first core 112 has written several message and reached the end of the data buffer 120 and the tail pointer 124 has returned to the start of the data buffer 120 queue, More particularly, a second message 136 includes the second message size 138 and the second message data 140. A third message 142 includes the third message size 144 and the third message data 146. A fourth message 148 includes the fourth message size 150 and the fourth message data 152.

With continued reference to FIG. 19, the head pointer 122 directed to the beginning of the second message 136 indicating that the second core 114 is going to start reading the second message 136. Since the tail pointer 124 keeps track of the message that have been sent and increments the tail pointer to indicate where the next message will be written, FIG. 19 is representative of a queuing port 116 that will direct the second core 114 to read the second message 136, then the third message 142, then the fourth message 148.

Figure 20:
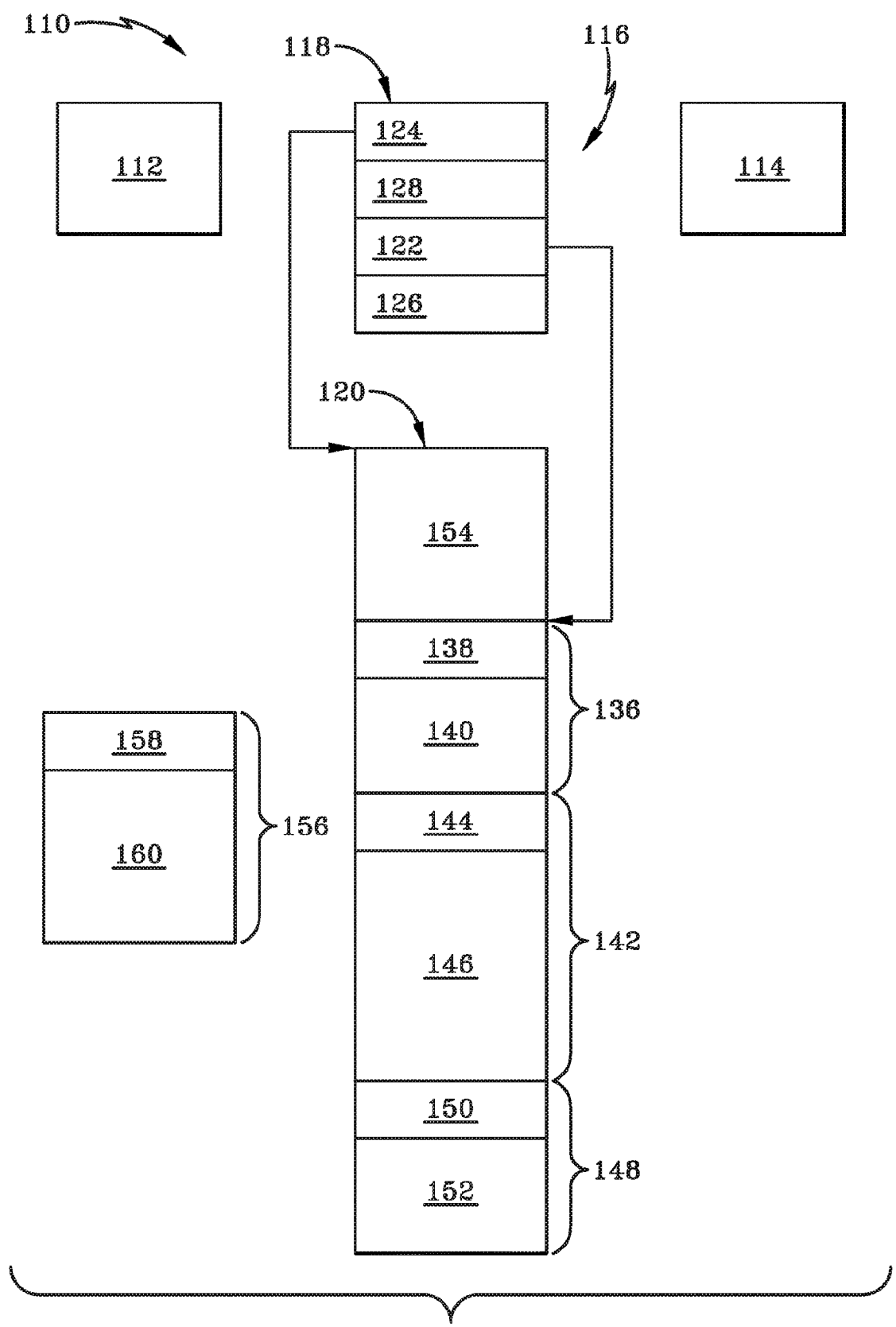
FIG. 20 depicts a push operation of the queueing port failing due to insufficient available space.

FIG. 20 depicts the queuing port 116 in a push operation that fails due to insufficient available space in the data buffer 120. The empty space in the data buffer 120 is represented as 154. A fifth message 156 includes the fifth message size 158 and the fifth message data 160. FIG. 20 indicates that the first core 112 attempts to write the fifth message 156, but there is not enough room in the data buffer 120. Stated otherwise, the fifth message 156 exceeds the size of the empty space 154 in the data buffer 120. Namely, the first core 112 determines whether the head pointer 122 is less than the size of the tail pointer 124 plus the size of the fifth message 156. If the head pointer 122 is less than the tail pointer 124 plus the fifth message 156, then the fifth message 156 is discarded. Stated otherwise, the first core 112 discards the fifth message 156 in response to determining that the fifth message 156 in addition to the tail pointer 124 are greater than that of the empty space 154 indicated by the location of the head pointer 122.

Figure 21:
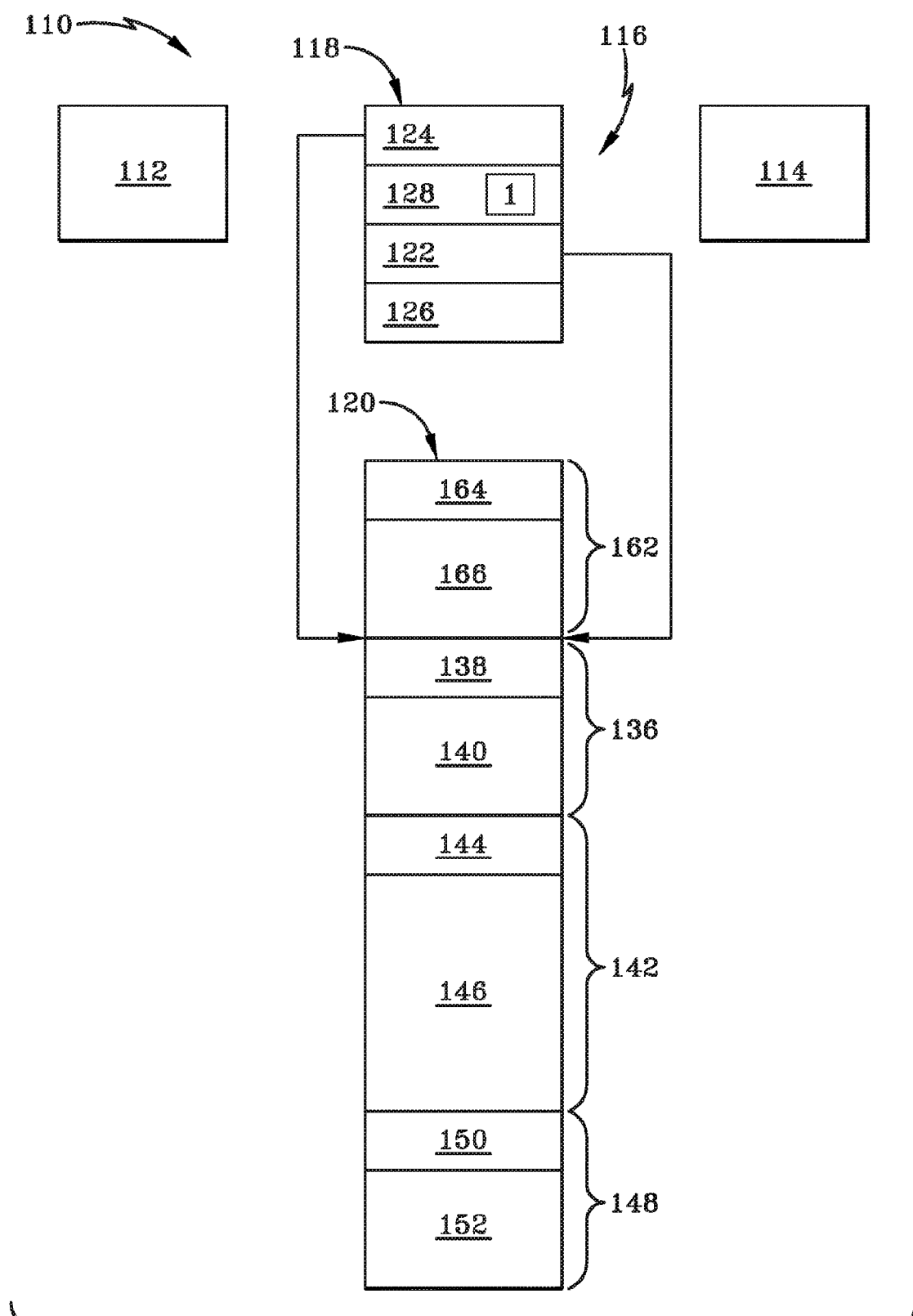
FIG. 21 depicts the queueing port becoming full after a successful push operation.

FIG. 21 depicts the queuing port 116, namely, the data buffer 120, becoming full after a successful push operation. A sixth message 162 includes a sixth message size 164 and a sixth message data 166. The first core 112 writes the sixth message 162 and there is sufficient room in the data buffer 120 to accommodate the sixth message 162. As such, the tail pointer 124 now equals the head pointer 122. Accordingly, the push counter 128 is incremented to one as indicated by the "1" in the push counter 128. The data buffer 120 is full. Notably, when the head pointer 122 equals the tail pointer 124 and the push counter 128 does not equal the pop counter 126, then the data buffer 120 of the queuing port 116 is full.

Figure 22:
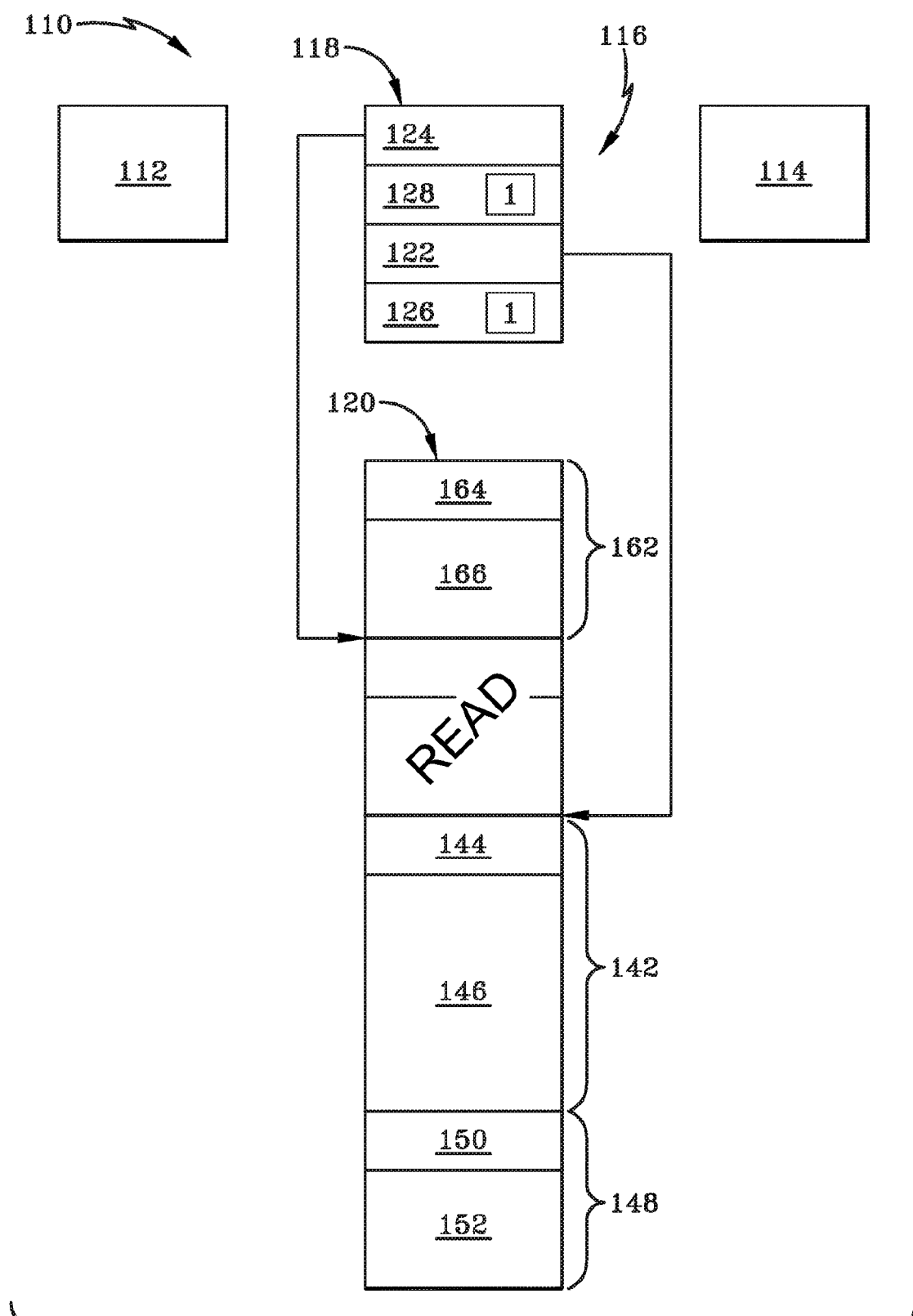
FIG. 22 depicts the queueing port becoming no longer full after a pop operation.

FIG. 22 depicts the data buffer 120 of the queuing port 116 becoming no longer full after a pop operation. The second message 136 is shown as read as indicated by the letters "READ." The head pointer 122 advances to the beginning of the third message 144. The tail pointer 124 remains at the end of the sixth message 162. The push counter 128 and the pop counter 126 are not equal. Thus, the pop counter is incremented as indicated by the number "1" in the pop counter 124. Since the tail pointer 124 does not equal the head pointer 122 and the push counter 128 equals the pop counter 126, the data buffer 120 of the queuing port 116 is no longer full.

Having thus described the structure of the hardware assembly 10 of FIG. 1-FIG. 16 and the hardware assembly 110 of FIG. 17-FIG. 22, reference is now made to the operation and exemplary functions thereof.

In one example, and with respect to FIG. 1-FIG. 16 the triple buffer 18 scheme of sampling port 16 is designed to allow simultaneous production (writing) and consumption (reading) of data. Data can be written to one buffer 18 by one core (such as core 14), while the other core (such as core 12) reads from a different buffer 18 in the sampling port 16.

Pointers 20, 22, and 24 are used to manage the buffers 18 to keep track of data and manage the buffers 18. As discussed above, the head pointer 20 indicates which slot/buffer data has last been written to. The tail pointer 22 indicates which slot/buffer data will be written to next. The busy pointer 24 indicates that a buffer slot is being read. In one example, there may be one Busy Pointer per core, shared between ports (since each core can only read from one port at a time) that directs the other core not to write to this slot, to prevent corruption of data being read. The pointers cooperate with instructions that, when executed by a processor, move the tail pointer to a subsequent buffer and if the tail pointer equals the busy pointer, then advance the tail pointer to an additional buffer. Further, there are instructions that, when executed by a processor, write data to the buffer indicated by the tail pointer. Additionally, instructions that, when executed by a processor, set the head pointer to equal the tail pointer when the data is written as indicated by the tail pointer.

In one example where there are a plurality of sampling ports 16 coupled together to form a usable computing system, each sampling 16 port may have its own head pointer 22, which points to the buffer 18 in which an entry has most recently been completely written. Further, each sampling port 16 has its own tail pointer 22, which points to the buffer 18 where data will be written next, or where data is currently being written. Additionally, each core has its own busy pointer 24, which points to the buffer slot which is currently being read by that core. If a core is not currently reading a sampling port, then that core's busy pointer 24 should be null (i.e., it should not point to any buffers). Stated otherwise, a null busy pointer 24 is a command used to direct a software program or operating system to an empty location in the computer memory. The null busy pointer 24 may be used to denote the end of a memory search or processing event. The busy pointer may further indicate that other cores must not write to the buffer it is pointing to, because that buffer is being read, and writing to it could cause data corruption.

In one example of the sampling port 16 triple buffer scheme of hardware assembly 10 in FIG. 1-FIG. 16, the buffer management when reading data operates as follows: obtain the sampling port's 16 head pointer 20. Then, assembly 10 sets the core's (such as core 12) busy pointer 24 to equal the sampling port's head pointer 20. Then, assembly 10 may read data from buffer slot indicated by head pointer 20. Then, assembly 10 may set the core's (i.e., core 12) busy pointer 24 to null when it is finished/done reading.

In operation, FIG. 1 illustrates the sampling port 16 with its associated pointers. The first core 12 reads from the sampling port 16 using the following method, process, or algorithm. Namely, reading the port's head pointer. Setting the core's busy pointer 24 to equal the port's head pointer 20. Then, reading data from buffer indicated by the head pointer 20. Then, setting the core's busy pointer 24 to null when finished with the read operation.

In operation, FIG. 2 and FIG. 3 illustrate a sampling port 16 during and after a write operation, respectively. In this particular example, the sampling port write algorithm only updates the port's head pointer 20 and tail pointer 22, while the sampling port read algorithm only updates the reading core's (i.e., first core 12) busy pointer 24. This ensures that there is no contention over the port management pointers; even though they can be read by both cores 12, 14, they are each only ever modified by a single core. Access logic may access the pointers atomically, so that there is no chance of pointer corruption caused by a simultaneous read and write.

In operation and with continued reference to FIG. 2 and FIG. 3, the buffer management protocol of assembly 10, when writing data, operates by moving port's tail pointer 22 to next buffer 18 slot. In one example, this may be accomplished by changing the value of tail pointer such that the tail pointer points to the next buffer slot. The operation is done by a pointer assignment. The address of the next buffer is known because the locations of the sampling port buffers do not change after initial allocation during instantiation of the port 16. If the port's updated tail pointer 22 equals the other core's busy pointer 24, then advancing the port's tail pointer 22 to an additional buffer slot (such as second buffer 18B). In one example, this may be accomplished by changing the value of tail pointer is changed such that the tail pointer points to the next buffer slot. The operation is done by a pointer assignment. To advance to an additional buffer slot is to use the slot that would be used after the slot that is marked busy Then, writing data to the buffer slot (such as first buffer 18A) indicated by the tail pointer 22. Then, setting the port's head pointer 20 to equal its tail pointer 24 when done writing. In one example the busy pointer 24 is only updated by the reading core, and the head pointer 20 and tail pointer 22 are only updated by the writing core (i.e., second core 14). These methods may be accomplished by write instructions that, when executed by a processor, only update the head pointer and the tail pointer, and read instructions that, when executed by a processor, only updates the busy point of the first core, wherein the write instructions and the read instructions are adapted to reduce the likelihood or preclude contention over the pointers. In a further embodiment the pointer contention is completely eliminated.

In operation, FIG. 4 and FIG. 5 illustrate the sampling port 16 during and after a read operation, respectively. Second core 14 writes to the sampling port 16 using the following algorithm or method of writing data to the buffer 18B indicated by tail pointer 22. Then, setting the port's head pointer 20 to equal its tail pointer 22 it is finished writing. Then, moving the port's Tail Pointer to next buffer. In one example, this may be accomplished by changing the value of tail pointer is changed such that the tail pointer points to the next buffer slot. If the port's updated tail pointer 22 equals other core's busy pointer 24, then advancing the port's tail pointer 22 to an additional slot.

In operation, FIG. 6-FIG. 12 depicts that an exemplary reason that sampling port 16 use three or more buffers, rather than two, is to handle the case where one write operation completes, and another write operation begins, while a read operation is occurring. In this situation, one buffer contains the data being read, one buffer contains the data that was finished being written during the read operation, and one buffer contains the data that started being written during the read operation. This process can be repeated for any number of additional write operations during a single read operation, with the writing core alternating between the two buffers that are not being read.

Sampling port 16 may further include a freshness reporting feature. Ports may be implemented to report freshness when reading the port. "Fresh" refers to data that was written to a port more recently than it was read from that port. The port has new, unread data. "Stale" refers data was read from a port more recently than it was written to that port. The port's data has not been updated since the last read. There are two basic freshness reporting methods: (i) Port Freshness Flag and (ii) Unique Message IDs.

Continuing with freshness reporting, the port freshness flag method may operate by the port maintaining a flag that indicates whether the port contains fresh or stale data. The flag may be maintained in the port's management structure. Then, setting the freshness flag to "fresh" when data is written. The routine that writes data to the port utilizes an atomic operation to simultaneously update the freshness flag and head pointer. Then, setting freshness flag to "stale" when data is read. The routine that reads data from the port utilizes an atomic operation to simultaneously read the head pointer and clear the freshness flag. If a read operation and write operation occur at the same time, then sequencing is determined by access to the port's head pointer 20. When the head pointer 20 is updated (at the end of a write operation), the freshness flag is set to "fresh". The routine that reads data from the port utilizes an atomic operation to simultaneously read the head pointer and clear the freshness flag.

Continuing with the port freshness flag method in this embodiment or, another embodiment, accesses to the head pointer 20 and the freshness flag occur atomically. In one example, the freshness indicator allows the reading partition to determine if the data has been updated since the partition's last reading of the data. If the pointer to the source of the data and the freshness indicator are not updated simultaneously by the writing partition, the reading partition has a possibility to interpret fresh data as being stale, or vice versa. After the writing core updates the head pointer 20, it must also be allowed to update the freshness flag before the reading core (i.e., first core 12) can read the head pointer 20 and update the freshness flag, otherwise the freshness flag may indicate "fresh" even though the latest data has already been read. In one example, this may be performed by processor instructions present in processors that allow for atomic operations. After the reading core (i.e., first core 12) reads the head pointer 20, it must also be allowed to read, and update the freshness flag before the other core can update the head pointer 20 and freshness flag, otherwise the freshness flag may indicate "stale" even though the latest data written to the port has not been read. This may be accomplished with instructions that, when executed by a processor, update the freshness flag at the same time that the head pointer is accessed.

In one embodiment of the port freshness flag method, each sampling port has its own flag, the freshness flag, which can be read to determine whether the port is fresh or stale. The freshness flag is updated at the same time that the head pointer 20 is accessed, because freshness is determined by the state (read or unread) of the message most recently written to the port, which is pointed to by the head pointer 20.

In one exemplary embodiment, updates to the freshness flag occur atomically with accesses to the head pointer. In this example, the freshness flag or freshness indicator allows the reading partition to determine if the data has been updated since the partition's last reading of the data. If the pointer to the source of the data and the freshness indicator are not updated simultaneously by the writing partition, the reading partition has a possibility to interpret fresh data as being stale, or vice versa. When a core (such as second core 14) accesses the head pointer 20, it must also be allowed to update the freshness flag before the other core (such as first core 12) can modify either the head pointer 20 or the freshness flag for the port's status to remain coherent. For instance, the following sequence of commands would cause the sampling port to report that it is "stale" even though it has new, unread data: (Write step 1) Writing second core 14 begins writing a message. (Read step 1) Reading first core 12 reads the head pointer 20, pointing to the most recent fully-written message. (Write step 2) Writing second core 14 finishes writing the message and moves the head pointer 20 to point to the new message. Then, the writing second core 14 sets the freshness flag to "fresh", indicating a new message is available, wherein this may be accomplished by setting the flag to "1" during the atomic operation. The reading first core 12 sets the freshness flag to "stale", indicating a message has been read—but the message that was read is no longer the port's most recent message. Then, implementing updates to the freshness flag to be atomic with accesses to the head pointer 20 forces commands 2 (i.e., reading the head pointer) and 5 (i.e., setting the freshness flag to stale) to occur consecutively, with the intervening updates to the head pointer 20 and freshness flag by the writing core (e.g. steps 3 and 4) occurring either before or after.

Thus, the method, process, or algorithm for reading the sampling port 16 that reports freshness using a freshness flag includes atomically reading the port's head pointer 20 and set the port's freshness flag to "stale". In one example, the freshness flag or freshness indicator allows the reading partition to determine if the data has been updated since the partition's last reading of the data. If the pointer to the source of the data and the freshness indicator are not updated simultaneously by the writing partition, the reading partition has a possibility to interpret fresh data as being stale, or vice versa. Then, setting the first core's 12 busy pointer 24 to equal the port's head pointer 20. Then, reading data from the buffer 18 indicated by the head pointer 20. Then, setting the first core's 12 busy pointer 24 to null when done reading. The method, process, or algorithm for writing to a sampling port that uses a freshness flag includes writing data to the buffer 18 indicated by tail pointer 22. Then, atomically setting the port's head pointer 20 to equal its tail pointer 22, and setting the port's freshness flag to "fresh", when done writing. Then, moving the port's tail pointer 22 to the next buffer 18. If the port's updated tail pointer 22 equals other core's busy pointer 24, then advance the port's tail pointer 22 an additional buffer 18 slot.

The other method for keeping track of a sampling port's freshness is the Unique Message IDs method. In this method, a unique ID (for example, a timestamp) is assigned to each message written to a sampling port. When the sampling port is read, the message's ID can be compared to the ID of the previous message read from the port: if the IDs are equal, then the port is stale (the message has already been read); if the IDs are unequal, then the port is fresh (the message is unread). Stated otherwise, for the Unique Message IDs Method, when a data entry is written to a port (such as by second core 14), a unique ID (such as a timestamp) is assigned to that entry. Whenever the port is read, the ID of the entry that is being read is compared to the ID of the last entry that was read from that port. If the ID being read equals the last ID that was read from that port, then the port's data is stale; otherwise it is fresh.

Multicore Scaling—Although the sampling port non-blocking contention management scheme put forward above is described for systems with two cores (one core which writes to the ports, and one core which reads the ports), the scheme is easily extended to multicore systems, where one core writes to the ports, and multiple cores can read from the ports. The following modifications are needed to generalize this scheme for a single-writer, multi-reader system. For multicore scaling, increase the number of buffers in each port, such that the number of buffers equals (1+the number of cores). Stated otherwise, the port 16 may add extra buffer slots, such that (# of buffer slots)=(# of cores+1). (For example, a tri-core solution would use quad-buffers rather than triple-buffers.) Hence, the dual-core solution uses a triple buffer, while a tri-core solution would use a quad buffer. Thus, the buffer count is one more than the core count. Additionally, scaling requires the addition of extra busy pointers, such that each reading core maintains its own busy pointer. Further, when the writing core is updating the tail pointer at the end of the write operation, it should continue advancing the tail pointer until it finds a buffer that none of the busy pointers are pointing to. This sampling port adds extra busy pointers, such that each core has its own busy pointers. When the writing core is searching for a buffer to write the next message to, check the buffer against all the other cores' busy pointers to ensure no core is reading it.

Having thus described the operation and exemplary advantages of the sampling port 16 with reference to FIG. 1-FIG. 16, reference is now made to the second embodiment of the queuing port 116.

Queuing Ports—a queuing port, such as port 116, is a type of data structure defined by ARINC 653 for communication between partitions. ARINC 653 (Avionics Application Standard Software Interface) is a software specification for space and time partitioning in safety-critical avionics real-time operating systems (RTOS). It allows the hosting of multiple applications of different software levels on the same hardware in the context of an Integrated Modular Avionics architecture. It is part of ARINC 600-Series Standards for Digital Aircraft & Flight Simulators. In order to decouple the real-time operating system platform from the application software, ARINC 653 defines an API called APplication EXecutive (APEX). Each application software is called a partition and has its own memory space. It also has a dedicated time slot allocated by the APEX API. Within each partition, multitasking is allowed. The APEX API provides services to manage partitions, processes and timing, as well as partition/process communication and error handling. The partitioning environment can be implemented by using a hypervisor to map partitions to virtual machines, but this is not required. Typically, an ARINC 653 platform includes: a hardware platform allowing real-time computing deterministic services; an abstraction layer managing the timer and space partitioning constraints of the platform (memory, CPU, Input/output); and an implementation for the ARINC 653 services (the APEX API); and an interface to be able to configure the platform and its domain of use.

Unlike a sampling port 16 (in which only the most recent message can be read), a queuing port 116 can hold multiple messages. Messages in a queuing port are accessible in a first-in, first-out (FIFO) pattern: when the port is read, the least recent message written to the port is obtained and discarded from the port; the next time the port is read, the next-least-recent message is obtained and discarded; and so forth. The size of each message stored in a queuing port need not be fixed, but the total size of the queuing port is limited and fixed. An attempt to write a message to a queuing port will fail if the port does not have enough room to hold the message.

In the context of queuing ports, a write operation is known as a "push" and a destructive read operation (where a message is obtained by a core and discarded from the port) is known as a "pop".

Unlike sampling ports, queuing ports are intrinsically free of contention over the data contained in each message, because unread messages are never overwritten in a queuing port. However, contention may exist over a queuing port's control data (e.g., fields that indicate whether the queue is full or empty, or where the next message will be written). The scheme described in this document safely manages this contention, allowing simultaneous production (writing) and consumption (reading) of messages.

FIFO (first in, first out) structure—a queuing port can include multiple messages which can be read destructively ("popped"). Port size is limited and fixed, and write ("push") attempt fails if the port does not have enough room for the new message.

Queuing Ports—Circular FIFO buffers: in one exemplary embodiment, each entry may begin with an indicator of the entry's size. This may be designed to allow simultaneous production (writing) and consumption (reading) of data. Queuing ports are intrinsically free of data contention since unread messages are never overwritten (unlike sampling ports). This design is also free of control contention because each queue management variable is updated by either the reading core or the writing core, but not both. Pointers and counters are used to manage the buffers, wherein the head pointer 122 indicates the next location to read from, the tail pointer 124 indicates the next location to write to. The push counter 128 is incremented when the queue becomes full after a push. The pop counter 126 is incremented when (push counter 128 does not equal pop counter 126) after a pop.

Queue management when reading ("popping") data operates by verifying that queue is not empty. A queue is interpreted to be empty when the head pointer is equal to the tail pointer and the push counter is equal to the pop counter. Then, reading the entry at the head pointer 122. If the push counter 128 does not equal the pop counter 126, then incrementing the pop counter 126. In this instance, a value of 1 is added to the current counter value by the reading partition. The value of the push and pop counters is not used except to check if they are equal or not. Then, updating the head pointer 122 such that the new head pointer equals the head pointer plus the entry size, wherein if the new head pointer is greater than the max entry size, then setting the new head pointer to beginning of queue. In one example, the management structure contains a pointer to the beginning of the queue that does not change after instantiation. This happens at the time when the reading partition determines that the head pointer would be set beyond the max entry size from the pointer to the beginning of the queue In another particular embodiment, the queue management when writing ("pushing") data operates by verifying that the queue has enough available space. Then, writing a new entry at the tail pointer. Then, determining the new value for the tail pointer, but not yet actually updating the tail pointer (New Tail Pointer=Current Tail Pointer+Entry Size) (If New Tail Pointer>Max Entry Size, then set New Tail Pointer to beginning of queue). If the new value for the tail pointer 124 equals the head pointer 122, then incrementing the push counter 128. Then, updating the tail pointer 124 to the new value previously determined (e.g., New Tail Pointer=Current Tail Pointer+Entry Size). Notably, in one exemplary embodiment, the head pointer and the pop counter are only updated by the reading core, and the tail pointer and the push counter are only updated by the writing core.

Determining if queue is empty operates by determining if the head pointer equals tail pointer and the push counter equals the pop counter, then the queue is empty. Determining if queue has enough available space for a new message operates by determining if the head pointer equals the tail pointer and the push counter does not equal the pop counter, then the queue is already full. If (Tail Pointer<Head Pointer< [Tail Pointer+Entry Size]), then the queue is not full but there is not enough available space for the message. In this case, the tail pointer would have to pass the head pointer to write the message, which would corrupt whatever data the head pointer points to.

In accordance with the assembly 110, queuing port(s) 116 are implemented as circular FIFO buffer queuing ports. Each entry in the FIFO buffer queuing port 116 includes a message and a header which contains the message's length (and optionally other implementation-dependent metadata). The following control fields may be used to manage the state of the FIFO such that the head pointer 122 points to the next location to read from in the FIFO. Then, the tail pointer 124 points to the next location to write to in the FIFO buffer queuing port. The push counter 128 may be incremented when the head pointer 122 equals the tail pointer 124 after performing a push operation. In one example, the only time that the head pointer and tail pointer are equal as the result of pushing data to the queue is when the queue is made full. The push counter is incremented so that the queue will be interpreted as full. A failure to increment this counter would result in the queue being interpreted as empty. The pop counter 126 is incremented when the push counter 128 does not equal the pop counter 126 after performing a pop operation. In yet another example, the push and pop counters being not equal is an indication that a queue is full. Since a message has just been removed from the queue, it is no longer full. It is expected that the increment will make the push and pop counters equal, thus no longer indicating full.

In operation, FIG. 17 illustrates a queuing port 116 and its control structure. The head pointer 122 and tail pointers 124 are used to access messages in the FIFO buffer queuing port 116, namely the data buffer 120, and to determine how much space remains in the FIFO buffer queuing port 116, particularly the data buffer 120, while the Push and Pop Counters are used to determine whether the FIFO buffer queuing port 116, namely the data buffer 120, is full or empty. This may be accomplished by instructions that, when executed by a processor, use the head pointer and the tail pointer to access messages in the circular FIFO buffer to determine how much space remains in the circular FIFO buffer, and instructions that, when executed by a processor, determine whether the circular FIFO buffer is full or empty In operation, FIG. 18 illustrates an empty queuing port. The data buffer 120 of the FIFO buffer queuing port 116 may be considered empty if the following conditions are met: The head pointer 122 equals the tail pointer 124; and the push counter 128 equals the pop counter 126.

In operation, FIG. 21 illustrates a full queuing port. The data buffer 120 of the FIFO buffer queuing port 116 is full if the following conditions are met: the Head Pointer equals the Tail Pointer; and the Push Counter does not equal the Pop Counter.

In operation, FIG. 20 illustrates a message being rejected due to insufficient queue space. The following criteria can be used to test whether a new message will fit in the data buffer 120 of the FIFO buffer queuing port 116: If the data buffer 120 of the FIFO buffer queuing port 116 is full (see above), then the message will not fit; if the head pointer 122 is greater than the tail pointer 124 and less than (Message Size+the Tail Pointer), then there is insufficient space for the message. This is because pushing the message would cause the tail pointer 124 to advance past the head pointer 122, overwriting whatever message the head pointer 122 is pointing. If neither of the above conditions is met, then the message will fit in the data buffer 120 in the FIFO buffer queuing port 116.

The following method, process, or algorithm can be used to perform a read (pop) operation with queuing port 116 by verifying that the data buffer 120 of the FIFO buffer queuing port 116 is not empty (see above); if it is empty, then aborting. Then, reading the entry pointed to by the head pointer 122. If the push counter 128 does not equal the pop counter 126, then incrementing the pop counter 126.

Updating the head pointer 122 operates by adding the entry's size to the head pointer 122. If the new head pointer 122 would be past the data buffer's 120 end address, then setting the new head pointer 122 to the start address of the data buffer 120.

In operation, FIG. 21 and FIG. 22 depict an illustration of a queuing port before and after a pop operation. Note that in this context the data buffer 120 of the FIFO buffer queuing port's 116 end address is the last address at which a message can begin (i.e., the last address that head pointer 122 or tail pointer 124 can point to), not the last address that can contain message data. Additional memory equal to the port's maximum supported message size must be allocated after the data buffer 120 of the FIFO buffer queuing port's 116 end address, to support the worst case of a maximum-size message that begins at the end address of the data buffer 120 of the FIFO buffer queuing port 116.

The following method, process, or algorithm can be used to perform a write (push) operation by verifying that the data buffer of the queueing port 116 has enough available space for the new message. Then, writing the new entry beginning at the tail pointer 124. Then, determining the new value for the tail pointer 124 (but not yet actually updating the tail pointer) by adding the entry's size to the tail pointer 124. If the new tail pointer 124 would be past the end of the data buffer 120, then setting the new tail pointer 124 to the beginning of the data buffer 120. If the new value for the tail pointer 124 equals the head pointer 122, then incrementing the push counter 128. Then, updating the tail pointer 124 to the new value determined.

In operation, FIG. 19 and FIG. 21 illustrate a queuing port before and after a successful push operation. Note that the head pointer 122 and pop counter 126 are only updated by the reading core, and the tail pointer 124 and push counter 128 are only updated by the writing core. This prevents the queuing port's control fields from being corrupted by being simultaneously modified by multiple cores.

In addition to the embodiments discussed above, other exemplary embodiments may utilize Sub-virtual link (VL) FIFO queue. A sub-VL FIFO queue is a type of data structure defined by ARINC 664. ARINC 664 defines a sub-VL FIFO queue as a collection of transmit ports. Each transmit port belongs to exactly one sub-VL. The sub-VL FIFO queue is a scheduling tool which keeps track of the order in which the sub-VL's ports' transmissions were initiated, to ensure that messages are transmitted in the correct order.

A sub-VL FIFO queue works like a queuing port in which each entry is a port identifier. The following rules may be applied when scheduling a transmission in the sub-VL FIFO queue. If the message is being transmitted or pushed into a queuing port belonging to the Sub-VL, then the queuing port identifier is unconditionally pushed into the sub-VL FIFO (provided the FIFO has enough space), because all messages placed in a queuing port will eventually be transmitted. If the message is being transmitted or pushed into a sampling port belonging to the Sub-VL, then the sampling port identifier is pushed into the sub-VL FIFO only if the port is not already present in the sub-VL FIFO. This is because only the most recent or latest message in the sampling port will be transmitted, so the port should not be scheduled for transmission multiple times.

Inter-core contention over a sub-VL FIFO queue can cause data loss in the case where a sampling port is pushed onto the sub-VL FIFO queue at the same time that the same port is being popped off the sub-VL FIFO. (A sampling port contains fresh data and its port identifier is at the front of the sub-VL FIFO.) In one exemplary special contention scenario the sequence includes the sampling port containing fresh data, and its ID is present in the Sub-VL FIFO. Then, reading, with the reading core, the sampling port. The, writing, with the writing core, a new message to the sampling port. The writing core may not put the sampling port's ID in the Sub-VL FIFO because it is already present. Then, popping, with the reading core, the sampling port's ID from the Sub-VL FIFO queue. This results in the sampling port having a new message that will never be scheduled for transmission, because the port identifier has not been placed in the sub-VL FIFO. The message written to the sampling port has been effectively lost.

In another example, mitigation is accomplished by allowing each sampling port to be placed in the Sub-VL FIFO queue twice. Each sampling port counts the number of instances of its port ID that are present in its Sub-VL FIFO queue. This counter is incremented by the writing core and decremented by the reading core. Therefore it must be updated atomically with the head pointer (i.e., sampling port freshness flag management). If the transmit scheduler reads a stale sampling port from the Sub-VL FIFO queue, it pops off that port and reads the next port in the Sub-VL FIFO queue instead.

In another exemplary solution mitigation can be accomplished by allowing each sampling port's identifier to have up to two instances in the sub-VL FIFO queue, rather than only one. Each sampling port maintains a count of the number of instances of its port ID that are present in its sub-VL FIFO. This counter may be incremented by the writing core when the port is pushed onto the sub-VL FIFO queue, and decremented by the reading core when the port is popped off the sub-VL FIFO queue. Because the counter is modified by both cores, accesses to the counter must be made atomic with accesses to the head pointer (like the sampling port Freshness Flag, described above).

When writing a message to a sampling port, the writing core first checks the counter, and the port identifier is pushed onto the sub-VL FIFO queue only if the counter is less than two. When reading a message from a port on the sub-VL FIFO queue, if the port is a sampling port that is stale, then the port is popped off the sub-VL FIFO queue and the next port on the sub-VL FIFO queue is read instead. Hence, messages are not transmitted redundantly.

The aforementioned exemplary solution/scheme works under the following assumptions. Namely, each sampling or queuing port can only be written to by one core at a time. Hence, one core is able to write to a port while another core reads the port, but if two cores attempt to write to the port simultaneously, the state of the port may be corrupted.

Further, each queuing port can only be read by one core at a time. If multiple ports attempt to pop messages off the same queuing port simultaneously, then the state of the queuing port may be corrupted. Additionally, read and write routines must not be interrupted and there must not be large gaps in between the execution of each instruction in each core's read and write algorithms, or else there is a chance that the state of the port will be corrupted. And, hardware must ensure cores have equal opportunity to access shared memory; that is, one core's memory accesses may not "starve out" another core's accesses. Generally this is ensured by the processor's coherency module in multicore processors. Typically the processor's coherency module handles this by arbitrating memory accesses to prevent starvation.

There are some alternative embodiments or approaches that may also accomplish similar goals. For example, there are two common existing approaches to handling inter-core contention over shared ports: semaphores and time partitioning. Each of these approaches has certain disadvantages compared to the scheme described in present disclosure.

With respect to semaphores or the semaphore method, a core that wishes to access a port (for reading or writing) reserves the entire port by setting a flag called a semaphore. When the core is done accessing the port, it clears the port's semaphore. If the port's semaphore is already set when a core attempts to access the port, then the core must wait until the semaphore has been cleared before it can proceed with its access. In some implementations, the core will "time out" and abort its access attempt if a certain amount of time elapses while the core waits for the semaphore to be cleared. The semaphore approach, while relatively easy to implement, suffers from poor worst-case timing, which makes it unsuitable for real-time systems. (This is less of a problem in non-real-time systems, where the core may be able to perform other useful tasks while waiting for the semaphore to be cleared.) The scheme described in this document allows multiple cores to access a port's data simultaneously, so that cores never need to wait to access port data.

The semaphore approach does not allow simultaneous port accesses from both cores. If both cores want to access a port at the same time, then one core gets the reservation, while the other core has to wait. Port accesses may "time out" and fail if the other core does not release the reservation. Poor worst-case timing—must assume each access requires the maximum waiting time for the reservation to clear.

With respect to time partitioning or the time partitioning method, each core's port accesses are scheduled such that accesses to the same port never occur simultaneously, thereby avoiding the problem of memory contention entirely. This method requires that the cores' schedules are synchronized, which may not be practical in certain systems (e.g., when two cores have different frame lengths). The scheme described in this document imposes no restrictions on when each port access occurs. In summary, the time partitioning method does not allow simultaneous port accesses from both cores, requires cores to be synchronized, and is not possible on some systems.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

Also, a computer or smartphone of the useable computing environment utilized to execute software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately"

may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An assembly comprising:
   at least one sampling port;
   at least two cores, wherein a first core reads the sampling port and a second core writes to the sampling port;
   a plurality of buffers in operative communication with each of the at least one sampling ports, wherein the number of buffers associated with each sampling port is at least one more than the number of cores, and the buffers are configured to hold a single message in the sampling port;
   a non-blocking contention management unit comprising a plurality of pointers,
      wherein the pointers manage contention at the buffers and prevent blocking of shared ports in a multi-core computing system,
      wherein the plurality of pointers includes:
      a head pointer indicating to which buffer data was most likely written,
      a tail pointer indicating to which buffer data will be next written, and
      a busy pointer indicating that a buffer is being read;
   write instructions that, when executed by a processor, only update the head pointer and the tail pointer;
   read instructions that, when executed by a processor, only update the busy pointer of the first core; and
      wherein the write instructions and the read instructions are adapted to reduce the likelihood or preclude contention over the pointers.

2. The assembly of claim 1, wherein: the first core is exclusively a reading core; and the second core is exclusively a writing core.

3. The assembly of claim 1, wherein the plurality of buffers includes:
   a first buffer, a second buffer, and a third buffer;
      wherein the first core reads data from one buffer simultaneous to the second core writing data to a different buffer.

4. The assembly of claim 2, wherein there is one busy pointer per reading core.

5. The assembly of claim 1, wherein the pointers may be read by the first core and the second core but are only modified by the second core.

6. The assembly of claim 1, further comprising:
   access logic that accesses the pointers atomically to reduce the likelihood of pointer corruption caused by simultaneous read and write operations.

7. The assembly of claim 1, further comprising:
   instructions that, when executed by a processor, move the tail pointer to a subsequent buffer and if the tail pointer equals the busy pointer, then advance the tail pointer to an additional buffer, wherein the buffers are in a circular arrangement such that subsequent to a last buffer the tail pointer advances back to a first buffer;
   instructions that, when executed by a processor, write data to the buffer indicated by the tail pointer; and
   instructions that, when executed by a processor, set the head pointer to equal the tail pointer when the data is written as indicated by the tail pointer.

8. The assembly of claim 7, further comprising:
   instructions that, when executed by a processor, report freshness of the data in the buffer through one of (i) a freshness flag and (ii) a unique message ID.

9. The assembly of claim 8, further comprising:
   instructions that, when executed by a processor, assign a unique ID to each message written to the sampling port;
   instructions that, when executed by a processor, compare the unique ID of each message to a unique ID of the previous message read from the sampling port; and
   wherein if the unique ID of each message and the unique ID of the previous message are equal, then the port is stale and if the unique ID of each message and the unique ID of the previous message are unequal, then the port is fresh.

10. The assembly of claim 8, further comprising:
    instructions that, when executed by a processor, report freshness of the data with the freshness flag to maintain a flag that indicates whether the port contains fresh or stale data;
    instructions that, when executed by a processor, sets the freshness flag to fresh when data is written and sets the freshness flag to stale when data is read; and
    wherein if a read operation and write operation occur at the same time, then a sequence is determined by access to the head pointer.

11. The assembly of claim 10, further comprising:
    instructions that, when executed by a processor, update the freshness flag and the head pointer atomically, wherein the updates appear to occur simultaneously from a perspective of the other of the first core and the second core.

12. The assembly of claim 10, further comprising:
    instructions that, when executed by a processor, update the freshness flag and read the head pointer atomically, wherein the update and the read appear to occur simultaneously from a perspective of the other of the first core and the second core.

13. A method comprising:
reading from, with a first core, at least two buffers from a sampling port or queuing port;
writing to, with a second core, the at least two buffers from the sampling port or queuing port;
managing, with a non-blocking contention management unit, contention to the at least two buffers in the sampling port or queuing port with a plurality of pointers for shared ports in a multi-core computing system.

14. The method of claim 13, wherein the non-blocking contention management unit has substantially no access wait time.

15. The method of claim 13, further comprising:
reading data, with the first core, from a first buffer simultaneous to the second core writing data to a second buffer.

16. The method of claim 13, further comprising:
indicating, with a head pointer, which buffer data was most recently written;
indicating, with a tail pointer, which buffer data will be next be written; and
indicating, with a busy pointer, that a buffer is being read.

17. The method of claim 16, further comprising:
accessing the pointers atomically to reduce the likelihood of pointer corruption caused by simultaneous read and write operations.

18. The method of claim 16, further comprising:
moving the tail pointer to a subsequent buffer and if the tail pointer equals the busy pointer, then advancing the tail pointer to an additional buffer;
writing data to the indicated buffer by the tail pointer; and
setting the head pointer to equal the tail pointer when the data is written as indicated by the tail pointer.

19. The method of claim 16, further comprising:
assigning a unique ID to each message written to the sampling port;
comparing the unique ID of each message to a unique ID of the previous message read from the sampling port; and
wherein if the unique ID of each message and the unique ID of the previous message are equal, then the port is stale and if the unique ID of each message and the unique ID of the previous message are unequal, then the port is fresh.

20. The method of claim 16, further comprising:
reporting freshness of the data with a freshness flag to maintain a flag that indicates whether the port contains fresh or stale data;
setting the freshness flag to fresh when data is written and sets the freshness flag to stale when data is read; and
wherein if a read operation and write operation occur at the same time, then a sequence is determined by access to the head pointer.

21. The method of claim 20, further comprising:
updating the freshness flag before the first core can read the head pointer and update the freshness flag.

22. The method of claim 21, further comprising:
updating the freshness flag at the same time that the head pointer is accessed.

23. The method of claim 13, further comprising:
reading a message from a port on a sub-virtual link (VL) first-in-first-out (FIFO) queue, wherein if the port is a sampling port that is stale, then the port is popped off the sub-VL FIFO queue and a next port on the sub-VL FIFO queue is read instead which is adapted to ensure that messages are not transmitted redundantly.

24. An assembly comprising:
a queuing port;
at least two cores, wherein a first core reads the queuing port and a second core writes to the queuing port;
a data buffer in operative communication with the queuing port, wherein the data buffer is associated with the queuing port, and the data buffer is configured to hold multiple messages in the queuing port;
a queue management control unit comprising a plurality of pointers, wherein the pointers manage the data buffer without the need to wait for access; and
wherein the assembly is adapted to manage contention of a plurality of shared queuing ports in a multi-core computing system.

25. The assembly of claim 24, further comprising:
wherein at least one core in the multi-core computing system reads or writes to the plurality of shared queuing ports;
a plurality of circular first-in-first-out (FIFO) buffers configured to be coupled to the plurality of shared queuing ports, wherein an entry in the FIFO buffers comprises a message and a header; and
a wherein the queue management control unit comprising a plurality of pointers and counters, wherein the pointers and counters manages the plurality of circular FIFO buffers.

26. The assembly of claim 24, further comprising:
a push counter that counts a number of push or write operations; and
a pop counter that counts a number of read or pop operations, and
wherein the plurality of pointers includes a head pointer and a tail pointer.

27. The assembly of claim 25, further comprising:
instructions that, when executed by a processor, use the head pointer and the tail pointer to access messages in the circular FIFO buffer to determine how much space remains in the circular FIFO buffer; and
instructions that, when executed by a processor, determine whether the circular FIFO buffer is full or empty based, at least in part, on the head pointer, the tail pointer, the push counter, and the pop counter.

28. The method of claim 13, further comprising:
reading a message from a port on a sub-virtual link (VL) first-in-first-out (FIFO) queue, wherein two or less instances of a sampling port identification (ID) in the sub-virtual link (VL) FIFO queue with a counter is incremented by the second core when the port is pushed onto the sub-VL FIFO queue, and decremented by the first core when the port is popped off the sub-VL FIFO queue.

* * * * *